United States Patent [19]

Doutsubo

[11] Patent Number: 5,045,957
[45] Date of Patent: Sep. 3, 1991

[54] RECORDING-REPRODUCTION SYSTEM HAVING A HEAD CYLINDER AND CAPSTAN SYSTEM CONTROLLER

[75] Inventor: Nobuhide Doutsubo, Daito, Japan

[73] Assignee: Sanyo Electric Co., Ltd., Moriguchi, Japan

[21] Appl. No.: 400,295

[22] Filed: Aug. 29, 1989

[30] Foreign Application Priority Data

Aug. 31, 1988 [JP] Japan .................................. 63-217431

[51] Int. Cl.$^5$ .............................................. G11B 15/44
[52] U.S. Cl. ...................................... 360/71; 360/74.1
[58] Field of Search ............... 360/71, 69, 74.1, 73.03, 360/75

[56] References Cited

U.S. PATENT DOCUMENTS

| | | | |
|---|---|---|---|
| 4,264,936 | 4/1981 | Mosciatti et al. | 360/71 |
| 4,385,330 | 5/1983 | Serafini | 360/71 |
| 4,649,441 | 3/1987 | Louth | 360/71 |
| 4,706,139 | 11/1987 | Maeda | 360/71 |

FOREIGN PATENT DOCUMENTS 61-271648 12/1986 Japan .

*Primary Examiner*—John H. Wolff
*Assistant Examiner*—Craig A. Renner
*Attorney, Agent, or Firm*—Armstrong, Nikaido, Marmelstein, Kubovcik & Murray

[57] ABSTRACT

A stop mode setting apparatus which includes a system controller having a time measuring device, and a driver for driving a capstan motor in response to a control signal from the system controller. When given a command for a change from a play mode to a stop mode, the system controller reversibly rotates the capstan motor only for a period of time determined by the time measuring device, thereby causing a swing idler to perform a swinging motion. During this swinging motion, a magnetic tape is moved from the capstan toward a head cylinder and given a suitable slack at the portion thereof between the capstan and the cylinder.

3 Claims, 32 Drawing Sheets

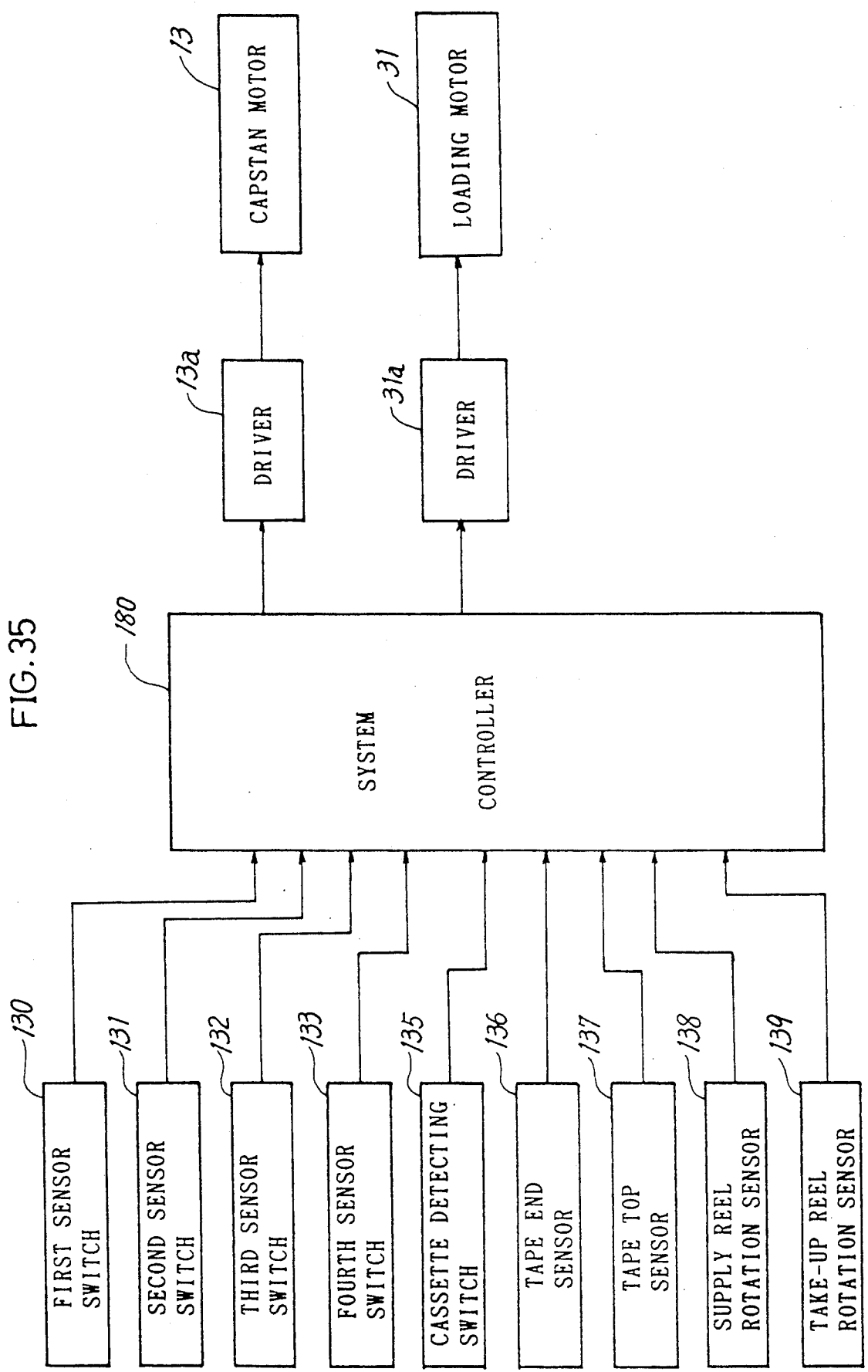

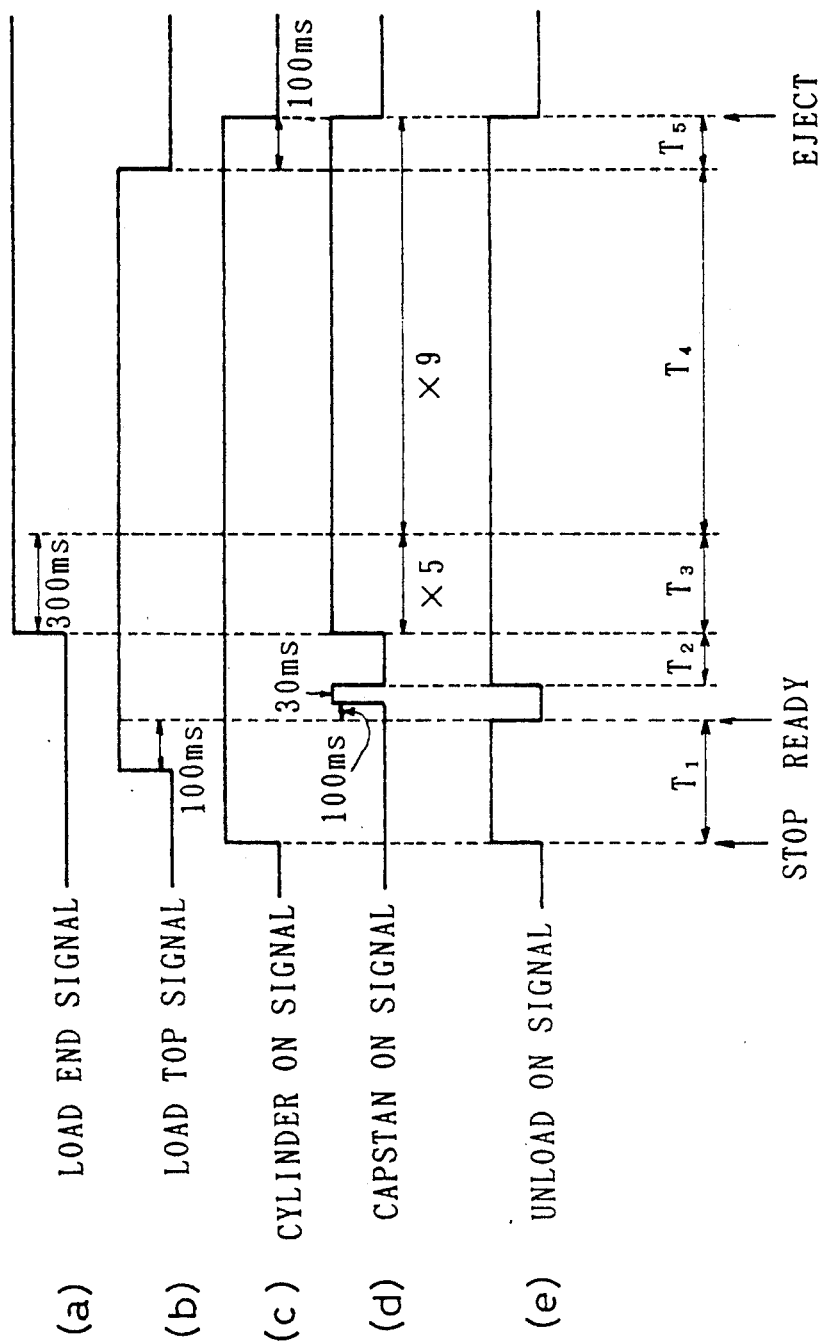

RECORDING-REPRODUCTION SYSTEM HAVING A HEAD CYLINDER AND CAPSTAN SYSTEM CONTROLLER

FIELD OF THE INVENTION

The present invention relates to systems for recording signals on magnetic tape or reproducing signals from magnetic tape, and more particularly to an apparatus for use in such a system for giving a suitable slack to the magnetic tape between head cylinder and a capstan when the system is to be set in a stop mode, wherein the head cylinder and the capstan are stopped with the magnetic tape held in pressing contact with the capstan by a pinch roller.

BACKGROUND OF THE INVENTION

In recent years, more compacted video tape recorders (VTRs) have been made available. More particularly, 8-mm VTRs are provided in a greatly reduced size with a diminished weight for use with 8-mm-wide magnetic tape.

With the development of compact and lightweight VTRs, VTRs have been introduced into use which comprise a camera unit and a VTR unit as an assembly. It is also possible to realize a portable image reproduction system which comprises a liquid-crystal television set and a VTR in the form of an assembly. Further reduced sizes are severely required for such VTRs.

Accordingly, VTRs are proposed which are variable for different modes in the depthwise length along the direction of insertion of the cassette as shown in FIGS. 41 and 42 (Examined Japanese Patent Publication SHO.61-271648).

The proposed VTR comprises a head cylinder 11 having a rotary magnetic head and mounted on a main chassis 1, a reel chassis 2 provided on the main chassis 1 and slidable toward or away from the head cylinder 11, and a supply reel support 21 and a take-up reel support 22 which are mounted on the reel chassis 2. The reel chassis 2 is driven by a chassis drive mechanism (not shown) coupled to a loading motor on the main chassis 1.

FIG. 41 shows the recorder in a standby mode, in which the reel chassis 2 is partially projected from the main chassis as indicated at A. In this state, a tape cassette 150 is loaded on the reel supports 21, 22 on the reel chassis 2.

FIG. 42 shows the recorder in a play mode, wherein the reel chassis 2 has been slidingly moved toward the head cylinder 11, which is in turn partly positioned in an opening B of the cassette 150. In this state, the magnetic tape is wound around the head cylinder 11 for recording or reproducing signals.

Thus, the depthwise length of the VTR can be reduced from $L_1$ to $L_2$ as illustrated. This renders the recorder convenient to carry.

The present application has invented a VTR comprising a reel chassis 2 slidably provided on a main chassis 1 as in the above VTR, and a pinch roller pressing means of a construction different from those of the prior art as will be described below (see FIGS. 5 to 7). The mechanism of this VTR is disclosed in a pending patent application filed in the Japanese Patent Office and not laid open yet.

The VTR includes a swing idler 110 which is coupled to a loading motor 31 for driving a supply reel support 21 and a take-up reel support 22. With the rotation of a loading motor 31, the idler 110 pivotally moves toward one of the reel supports and is eventually operatively connected to the reel support to transmit the rotation thereto.

In the play mode wherein a magnetic tape 151 is pressed against a capstan 12 by a pinch roller 81, as shown in FIG. 7, the tape is transported from a head cylinder 11 toward the capstan 12. The recorder is set in the stop mode wherein recording or playback is interrupted, by stopping the rotation of the head cylinder 11 and the capstan 12 in this state.

The pinch roller 81 is not released from the capstan 12 in the stop mode in order to ensure a rapid change from the stop mode to the play mode.

In the stop mode of the conventional VTR wherein the pinch roller is not released, the magnetic tape is positioned along the specified path of travel under tension and is held between the capstan and the pinch roller and thereby restrained from movement. Consequently if the conventional stop mode is used as it is for the VTR of the pending application, the following problem arises.

When the head cylinder is initiated into operation in response to a command for the change of the stop mode to the play mode, the head cylinder cannot be brought into proper operation rapidly owing to the friction between the cylinder periphery and the magnetic tape thereby resulting in faulty recording or reproduction immediately after the setting of the play mode.

This problem can be advantageously overcome by giving some slack to the magnetic tape between the head cylinder and the capstan when the play mode is to be changed to the stop mode.

SUMMARY OF THE INVENTION

An object of the present invention is to provide a recording-reproduction system which intentionally slackens the magnetic tape when the system is to be set in the stop mode, by rotating the capstan in the tape rewinding direction for a predetermined period of time with a swing idler held in a neutral position out of engagement with either reel support.

The stop mode setting apparatus embodying the present invention for use in a recording-reproduction system comprises a system controller to be given a command to set the system in a stop mode to stop a head cylinder and a capstan in a play mode, and a driver for driving a capstan motor according to a control signal produced from the system controller.

The system controller comprises capstan control means for controlling the starting, stopping and rotational direction of the capstan motor, and means for measuring a predetermined period of time required for a swing idler to pivotally move out of operative relation with one of a supply reel support and a take-up reel support to a neutral position out of connection with either of the reel supports.

When a chance to the stop mode is commanded in the play mode, the capstan motor is reversibly driven only for the period of time determined by the time measuring means, whereby the idler is pivotally moved away from the take-up reel support toward the supply reel support and held in the neutral position out of operative relation with either reel support for the period.

While the idler is held in its neutral position, the magnetic tape is paid off toward the head cylinder by the operation of the capstan, resulting in a suitable amount of slack is given to the tape at the portion thereof positioned between the capstan and the head cylinder.

The stop mode setting apparatus of the present invention gives a suitable slack to the tape between the head cylinder and the capstan with a change to the stop mode, so that the head cylinder can be smoothly initiated into operation when the stop mode is thereafter changed over to the play mode.

The stop mode setting apparatus of the present invention is useful not only for VTRs of the expandable type wherein a subchassis is slidably provided on the main chassis, but also for common VTRs, audio tape recorders and the like having a single chassis.

BRIEF DESCRIPTION OF THE DRAWINGS

FIG. 35 is a block diagram showing a circuit for controlling a capstan motor and the loading motor;

FIGS. 36 (a), (b), (c), (d) and (e) show control signals for an unloading operation for the illustration of timing;

DETAILED DESCRIPTION OF THE PREFERRED EMBODIMENTS

Figure 1:
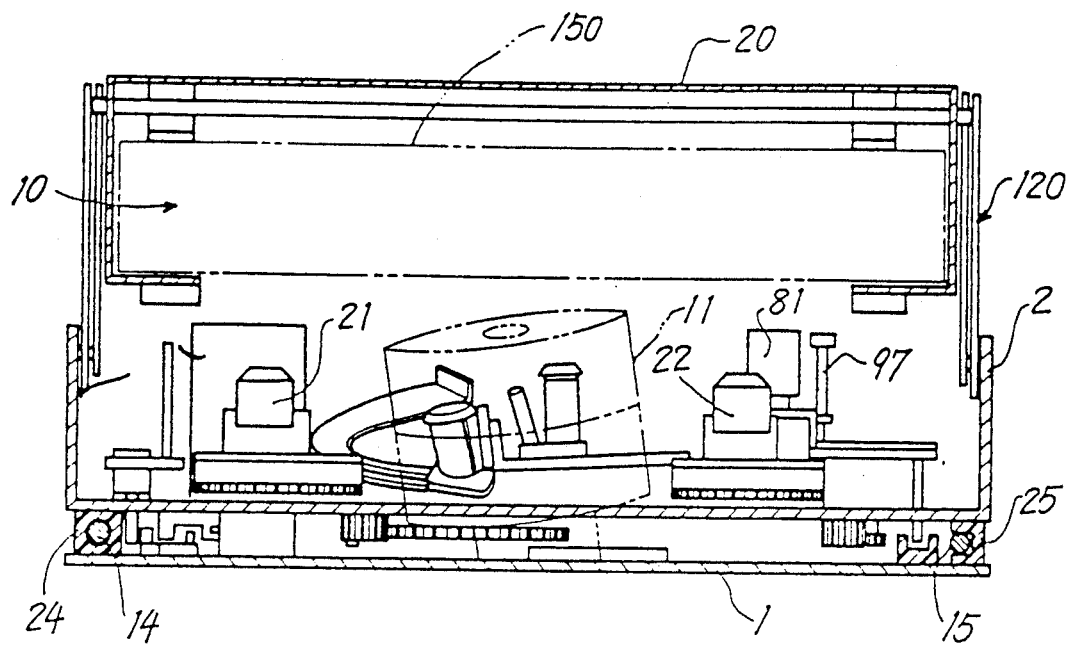
FIG. 1 is a front view showing a VTR embodying the invention in an eject mode.

The present invention will be described below in detail with reference to the illustrated embodiment, i.e., 8-mm VTR.

OVERALL CONSTRUCTION

With reference to FIGS. 1 to 4, 8 and 9, the illustrated VTR includes a main chassis 1 provided with a head cylinder 11, and a reel chassis 2 provided with a supply reel support 21 and a take-up reel support 22, mounted on the main chassis 2 and slidable toward or away from the head cylinder 11. A cassette holder 20 is supported by a holder lift mechanism 120 on the reel chassis 2 in an upwardly and downwardly movable manner.

Figure 2:
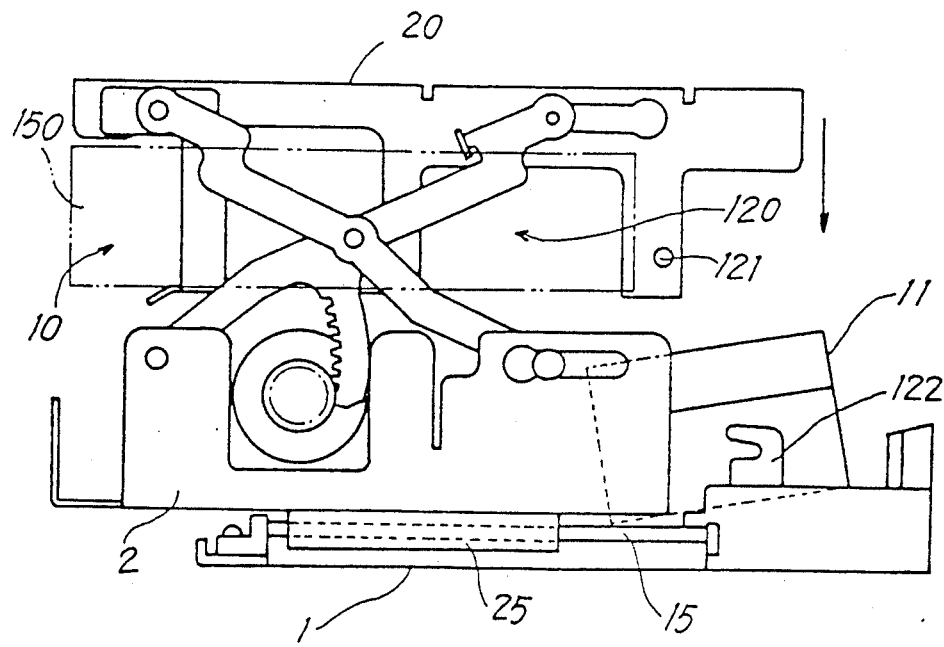
FIG. 2 is a right side elevation of the same.
Figure 9:
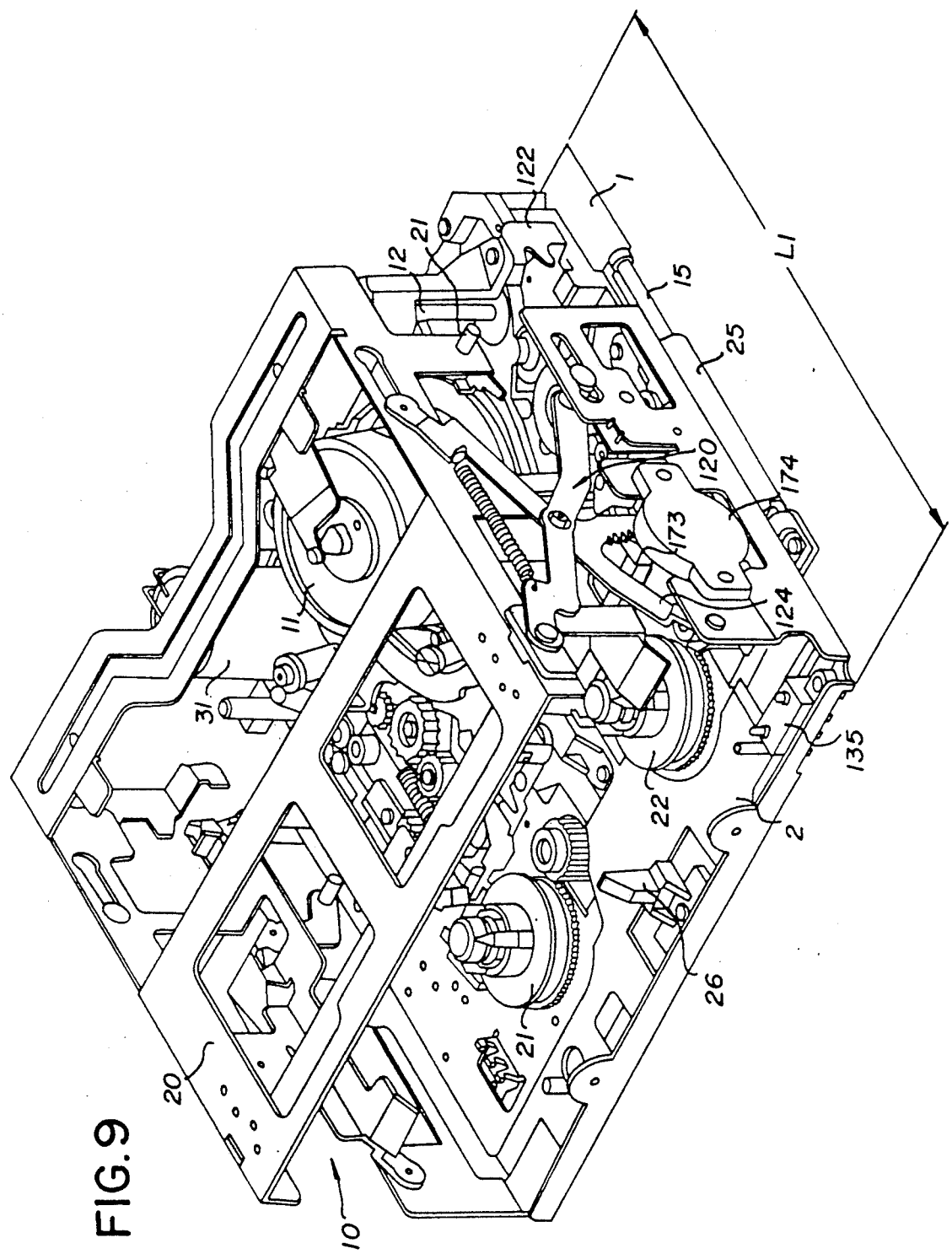
FIG. 9 is a perspective view of the same in the eject mode.

FIGS. 1, 2 and 9 show the VTR in an eject mode wherein the reel chassis 2 has been projected outward from the main chassis 1 to the greatest extent away from the head cylinder 11, with the cassette holder 20 raised from the reel chassis 2. In this state, a tape cassette 150 is placed into the cassette holder 20 through a cassette inlet 10.

Figure 3:
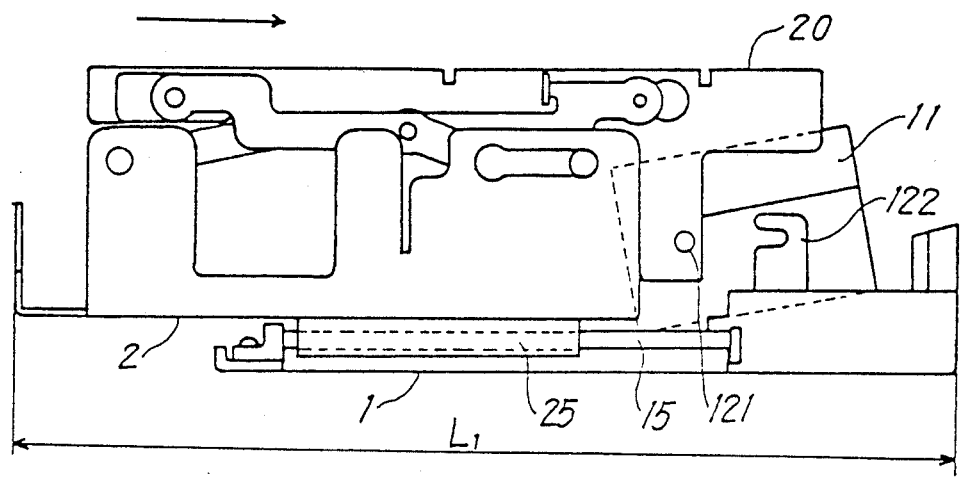
FIG. 3 is a right side elevation showing the same in a standby mode.

FIG. 3 shows the cassette holder 20 as being depressed from its position in the eject mode and locked to the reel chassis 2. In this state, i.e., a standby mode, the recorder has a depthwise length $L_1$ of 103 mm.

Figure 4:
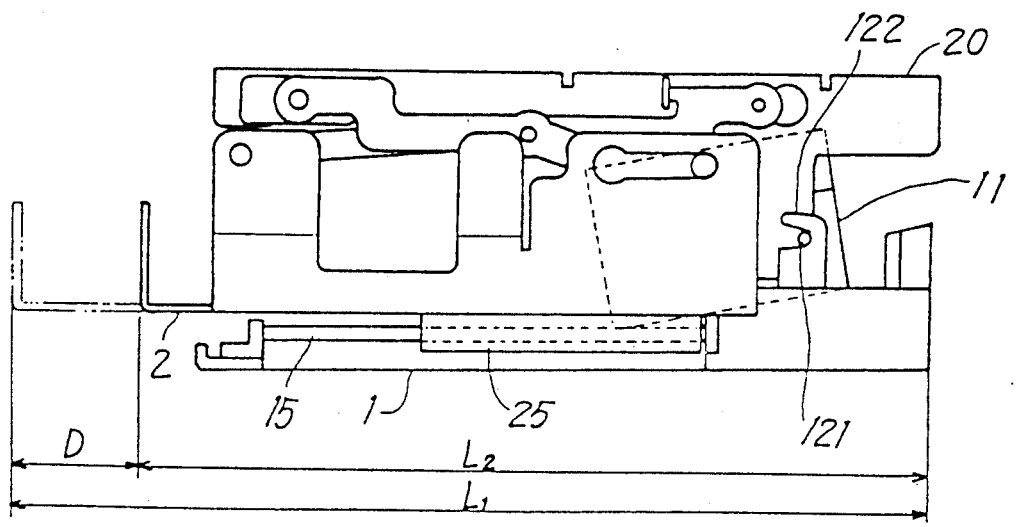
FIG. 4 is a right side elevation of the same in a play mode.
Figure 8:
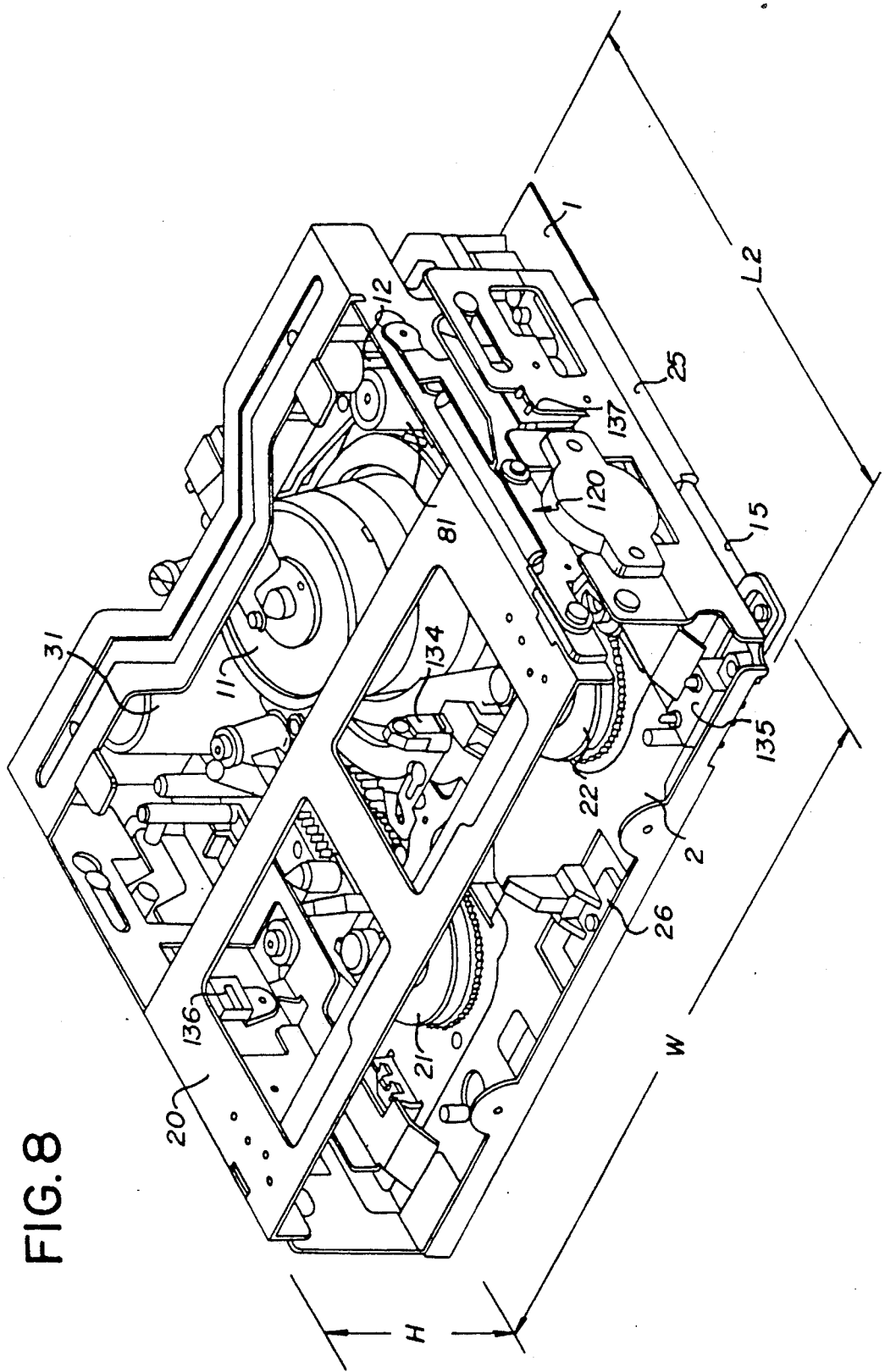
FIG. 8 is a perspective view of the VTR in the play mode.

FIGS. 4 and 8 show the reel chassis 2 as retracted from its position in the standby mode toward the head cylinder 11, with a tape loading mechanism, pinch roller pressing mechanism, etc. brought into operation with this movement as will be described later. The distance D in which the reel chassis 2 is retracted from the standby-mode position is 16 mm. With the reel chassis thus retracted, the recorder has a minimum depthwise length $L_2$ of 87 mm, a width W of 109 mm and a height H of 32 mm.

CHASSIS DRIVE MECHANISM 3

Figure 10:
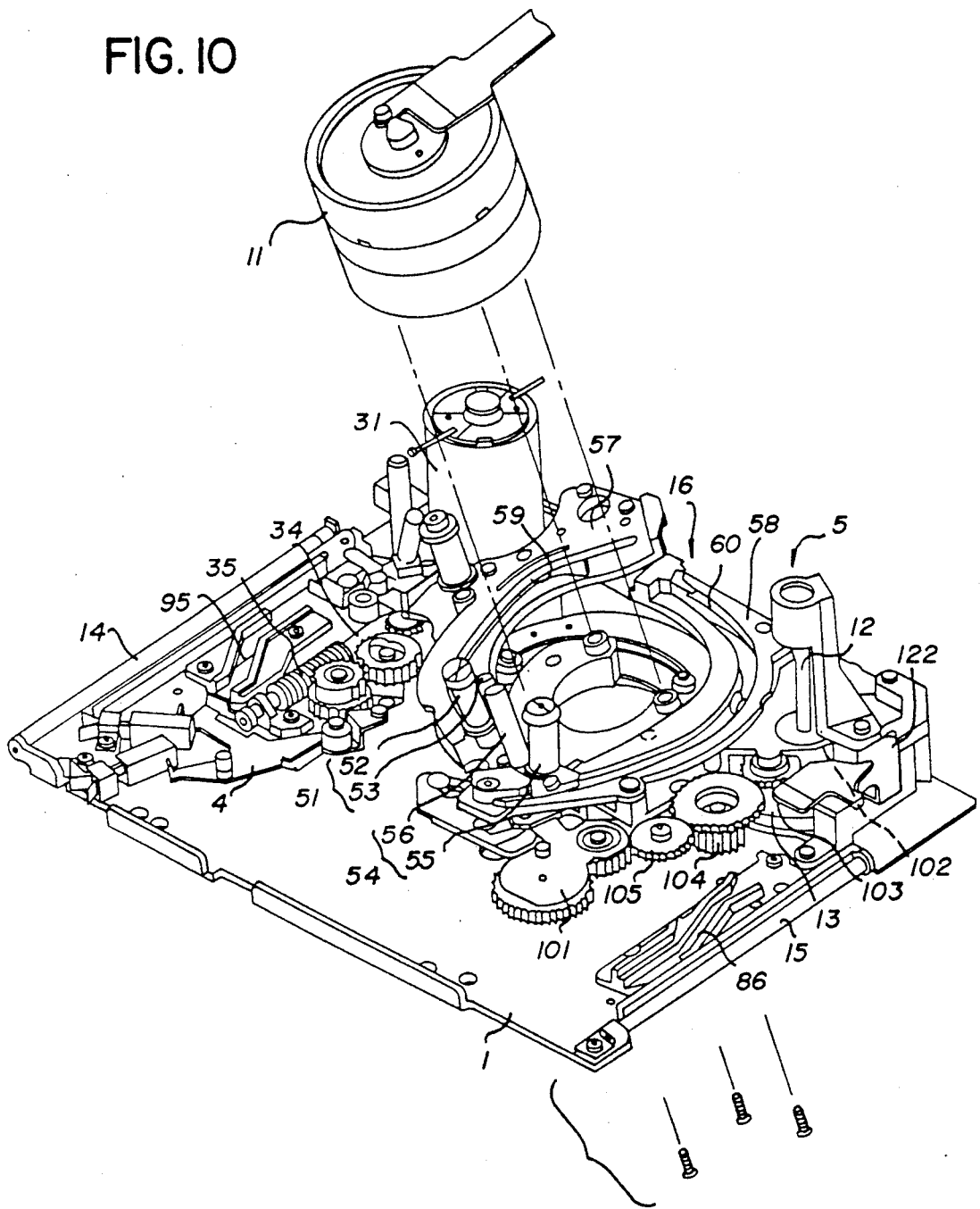
FIG. 10 is a partly exploded perspective view showing mechanisms on a main chassis.
Figure 16:
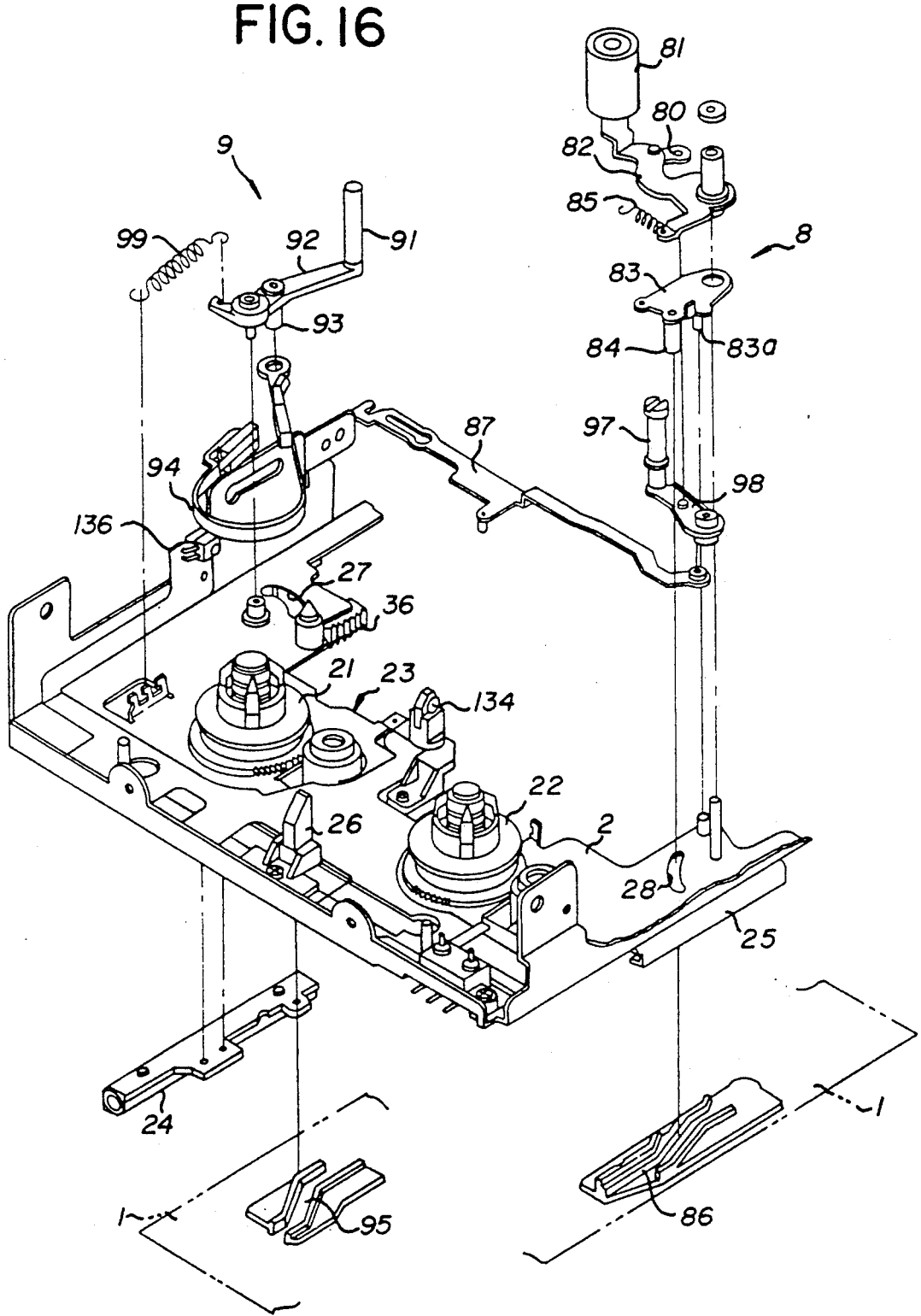
FIG. 16 is an exploded perspective view showing mechanisms on a reel chassis.
Figure 18:
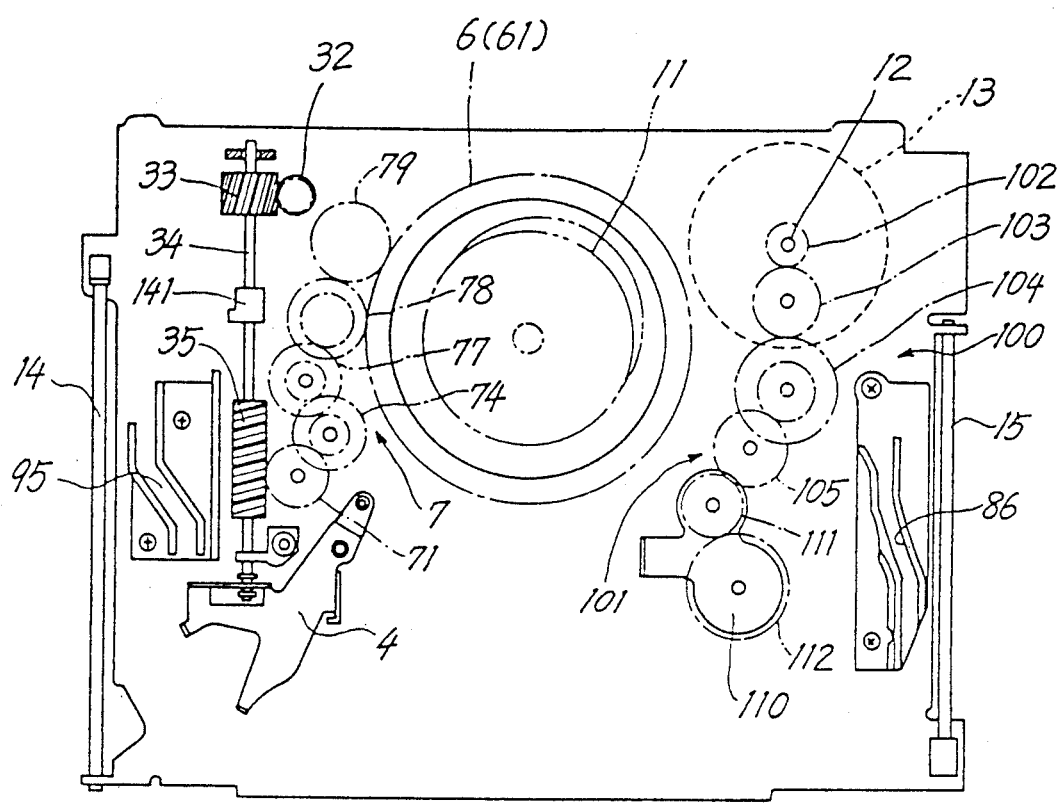
FIG. 18 is a plan view of the mechanisms on the main chassis.
Figure 19:
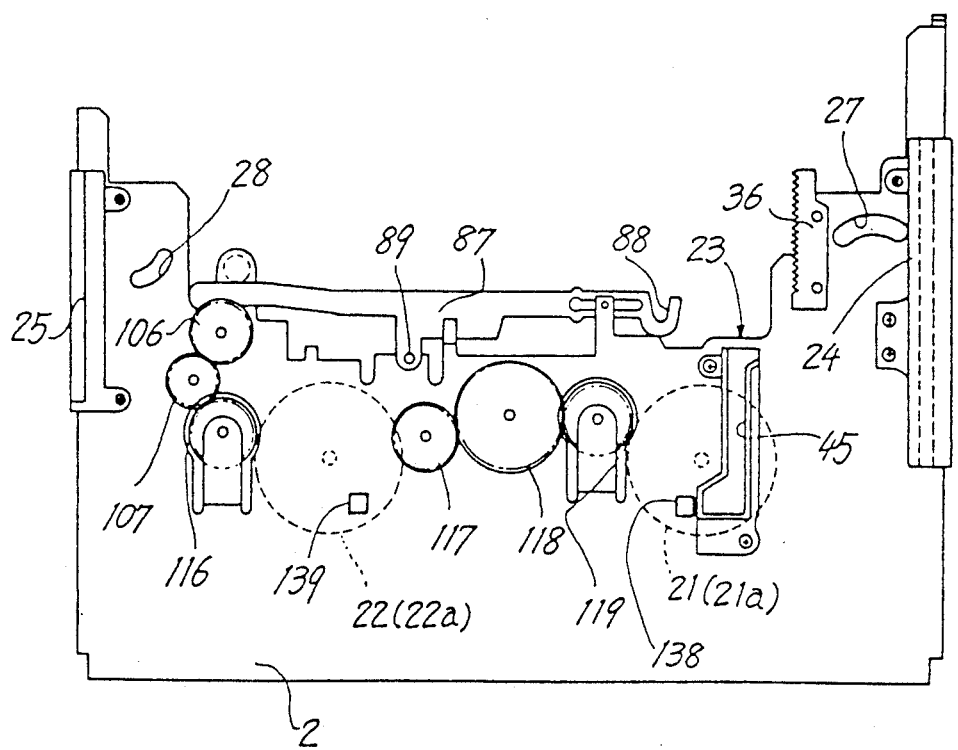
FIG. 19 is a rear view of the mechanisms on the reel chassis.

The main chassis 1 is rectangular as seen in FIGS. 10 and 18. The reel chassis 2 is greatly cut out as indicated at 23 at the central portion of its rear end to avoid contact with the head cylinder 11, as seen in FIGS. 16 and 19.

Figure 17:
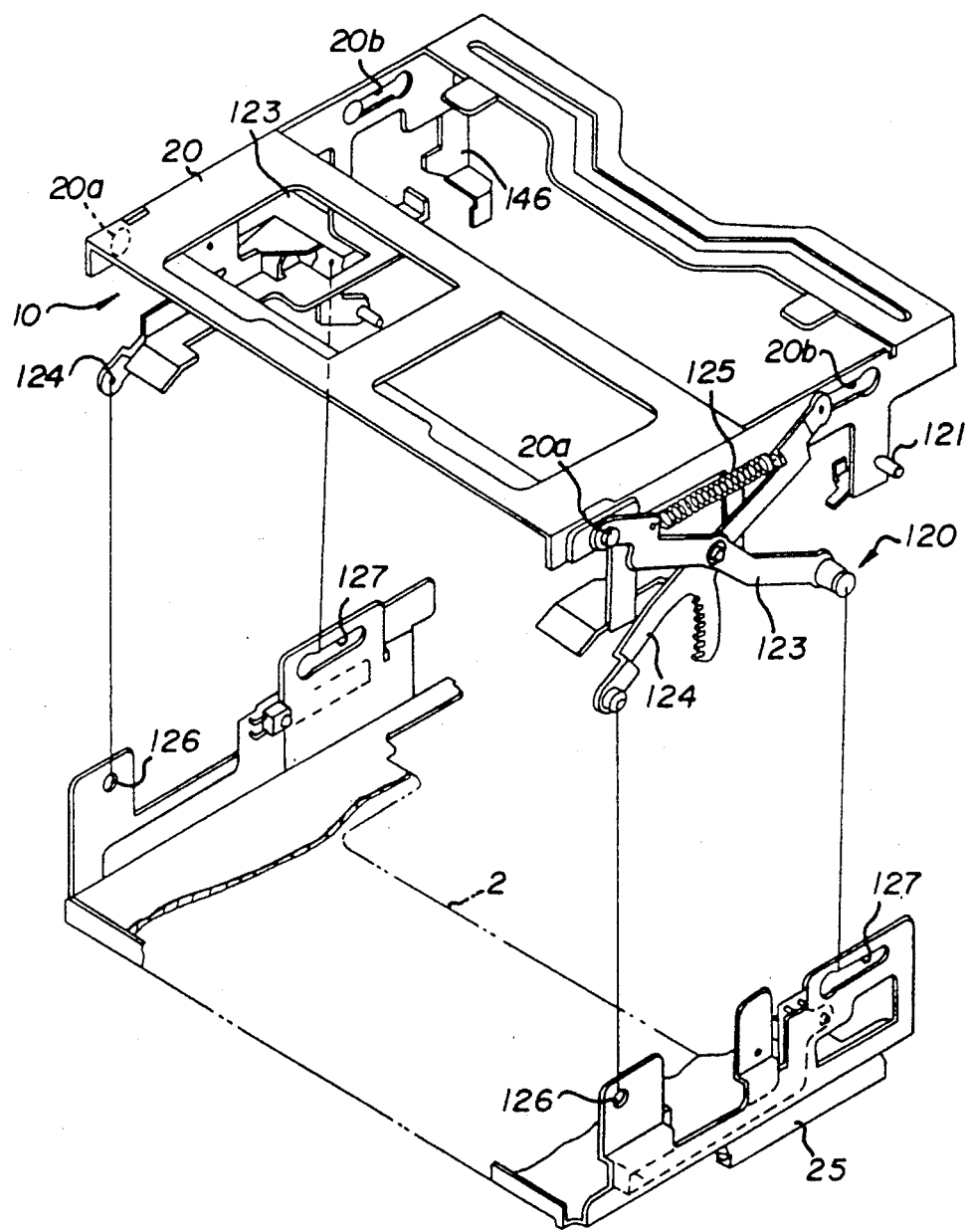
FIG. 17 is an exploded perspective view of a cassette holder and a holder lift mechanism.

The main chassis 1 is provided at its opposite sides with a pair of guide shafts 14, 15 in parallel with each other, as shown in FIGS. 10 and 18. The reel chassis 2 has a pair of slide members 24, 25 at its respective sides as shown in FIGS. 17 and 19. The guide shafts 14, 15 are slidably fitted in the respective slide members 24, 25 as shown in FIGS. 1 to 4, whereby the reel chassis 2 on the main chassis 1 is guided for movement and restrained from moving beyond a specified distance.

Figure 12:
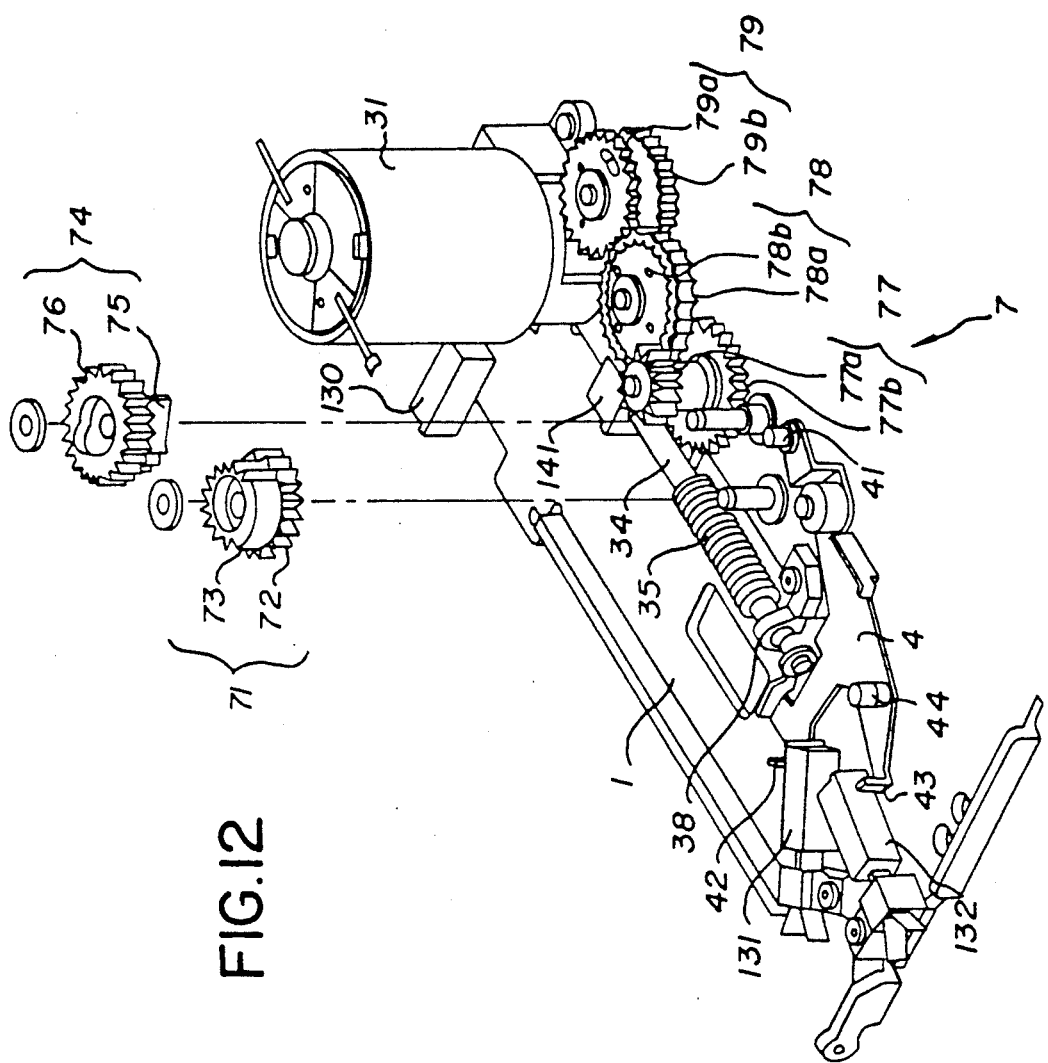
FIG. 12 is a partly exploded perspective view of a gear mechanism to be driven by a loading motor.
Figure 15:
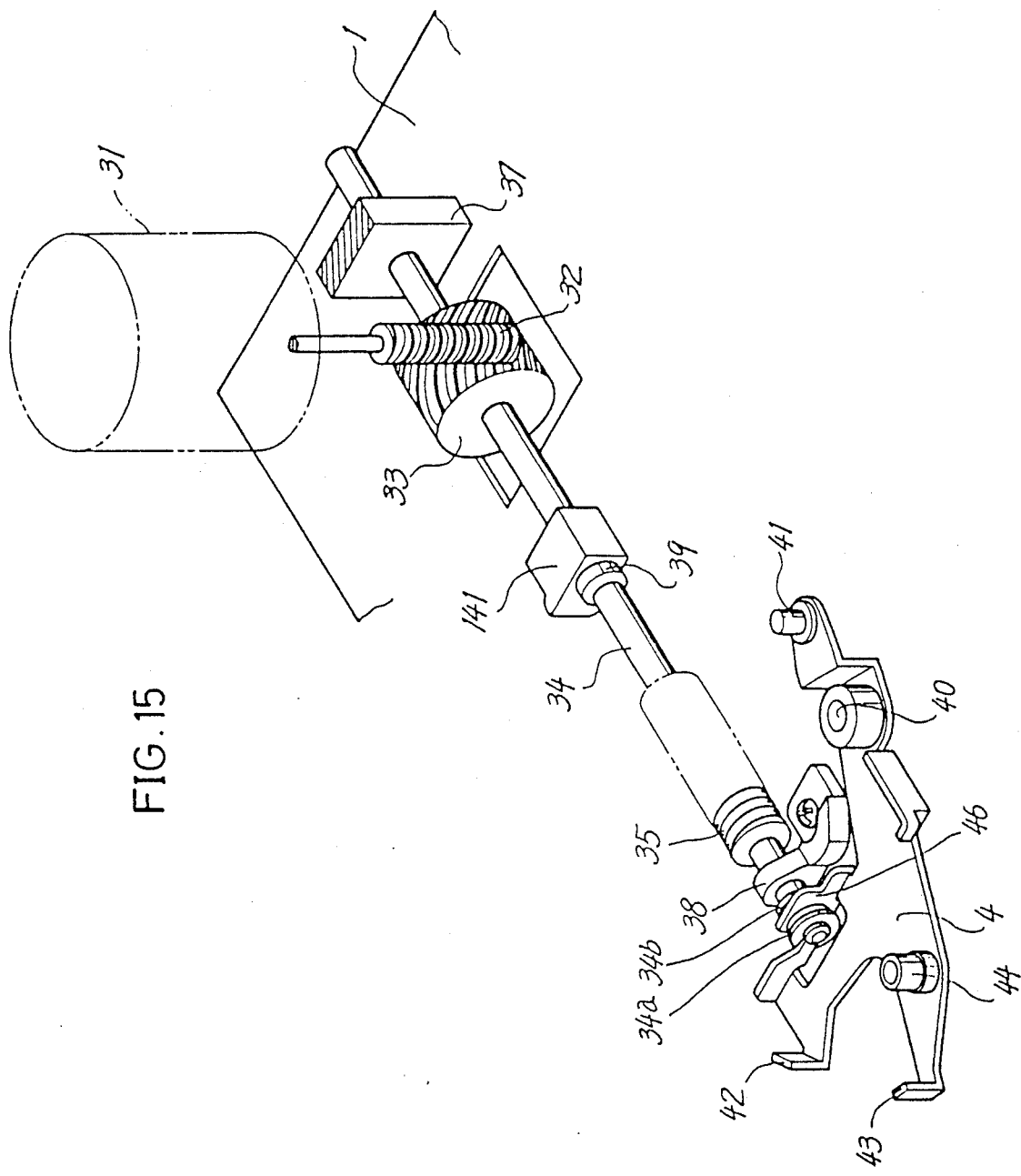
FIG. 15 is a perspective view of a power shaft and a mode lever.

With reference to FIGS. 12, 15 and 18, a loading motor 31 mounted on the main chassis 1 has an output shaft carrying a drive worm 32. A power shaft 34 extending in the direction of movement of the reel chassis is supported at its opposite ends by bearing members 37, 38 on the main chassis 1 in a rotatably and axially movable manner.

Fixedly mounted on the power shaft 34 are a helical gear 33 meshing with the worm 32 and disposed close to the bearing member 37 adjacent the motor 31, and a worm 35 disposed close to the other bearing member 38. A flange 39 is secured to an intermediate portion of the power shaft 34 between the helical gear 33 and the worm 35. A drive piece 141 providing the holder unlocking mechanism to be described later is slidably fitted around the power shaft 34 on one side of the flange 39 closer to the helical gear 33. A pair of flanges 34a, 34b arranged at a spacing are secured to the end of the power shaft 34 close to the worm 35. Between these flanges, the mode lever 4 to be described later is engaged with the shafr 34.

Referring to FIGS. 16 and 19, a rack 36 facing the cutout 23 and extending along the direction of the movement of the reel chassis 2 is fixed to the reel chassis 2 and is in mesh with the worm 35 at all times.

Figure 20:
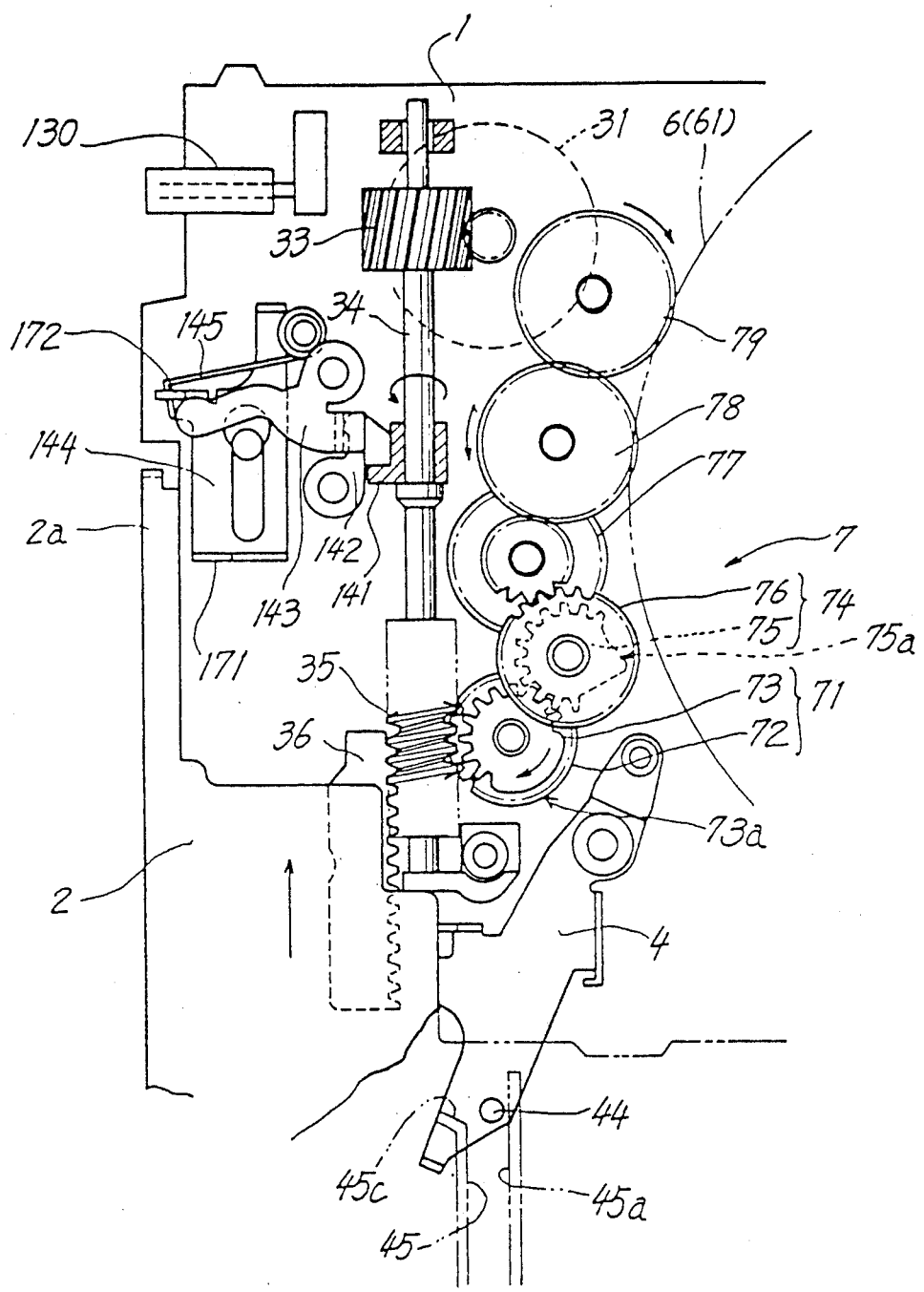
FIG. 20 is a plan view showing the power shaft and the mechanism coupled thereto, as seen in the standby mode.

Accordingly, when the helical gear 33 is driven by the loading motor 31 to rotate the power shaft 34 in the direction of arrow shown in FIG. 20, the worm 35 drives the rack 36, thereby retracting the reel chassis 2 toward the main chassis 1, whereas if the loading motor 31 is rotated reversibly, the reel chassis 2 moves away from the main chassis 1.

Figure 21:
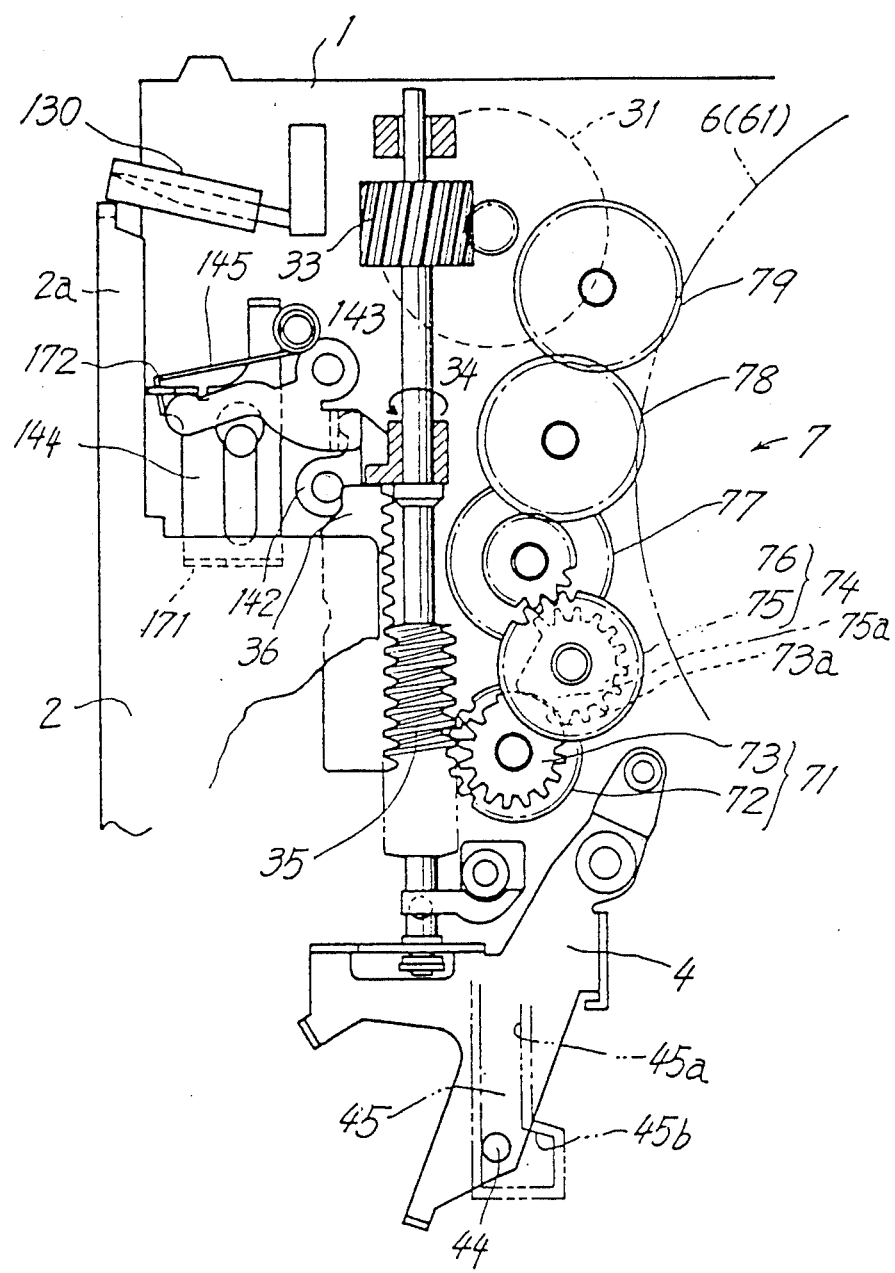
FIG. 21 is a plan view of the same in the ready mode.

A first sensor switch 130 is mounted on the main chassis 1 and opposed to a front end portion 2a of the reel chassis 2 at the left side thereof. Upon the reel chassis 2 reaching its retracted limit position as seen in FIG. 21, the front end portion 2a actuates the first sensor switch 130, whereby the completion of loading operation of the reel chassis 2 is detected.

During the travel of the reel chassis 2, the power shaft 34 is subjected to a thrust load, whereas a roller 44 provided on the mode lever 4, as will be described later, engages in a straight portion 45a of a guide channel 45 on the reel chassis 2. This prevents the rotation of the mode lever 4, thereby precluding the power shaft 34 from moving axially thereof (see FIG. 21).

TAPE LOADING MECHANISM 5

With reference to FIG. 10, a cylinder unit 16 provided on the inner central portion of the main chassis 1 comprises the head cylinder 11 having a rotary magnetic head, a capstan 12, a capstan motor 13 for driving the capstan, and a tape loading mechanism 5 for winding the magnetic tape around the head cylinder 11.

Figure 11:
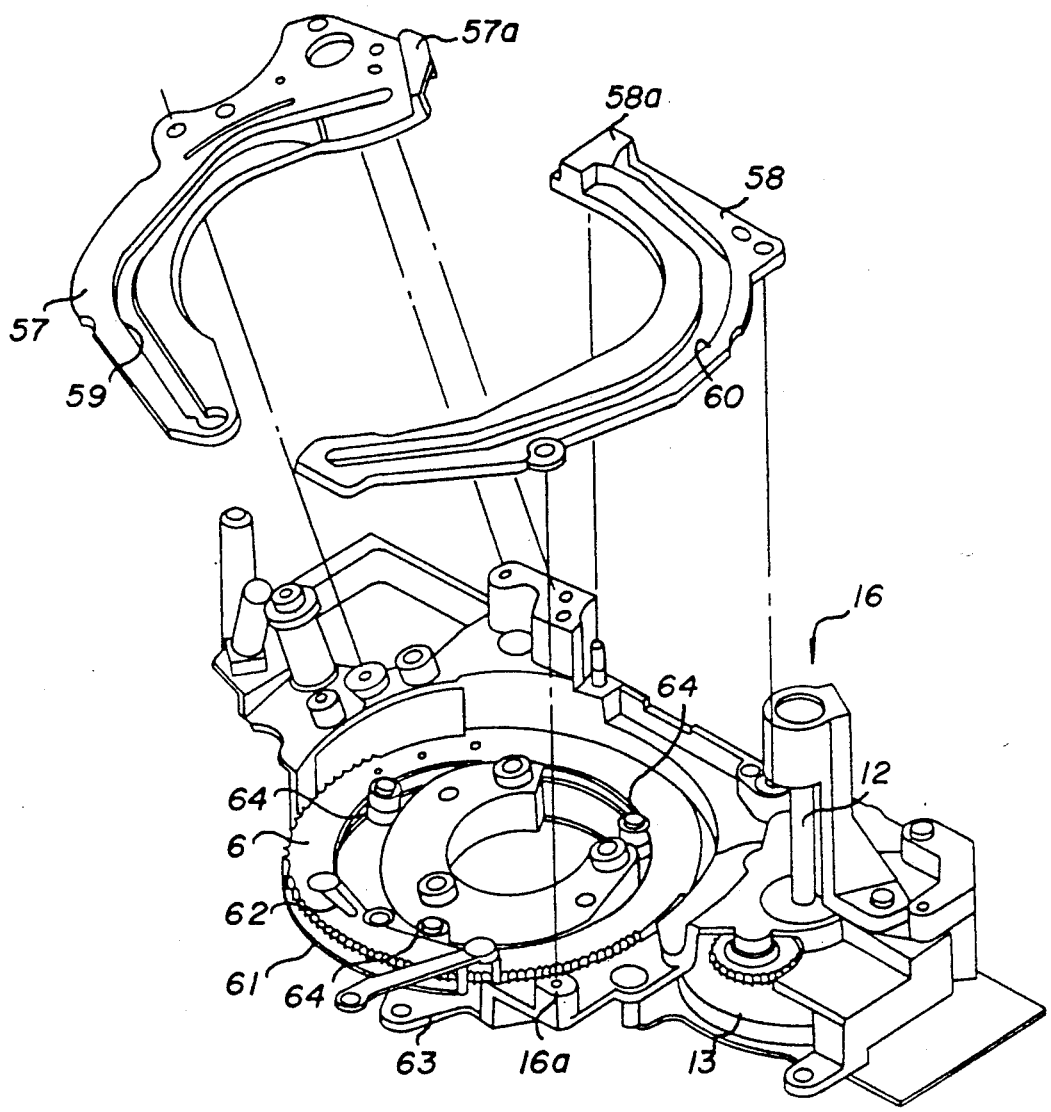
FIG. 11 is a partly exploded perspective view of a cylinder unit.

The tape loading mechanism 5 comprises two ring gears 6, 61 arranged concentrically one above the other at two levels around a cylinder base 16a having the head cylinder fixedly mounted thereon as seen in FIG. 11. The ring gears 6, 61 are rotatably supported by a plurality of support rollers 64.

Fixedly provided above the ring gears 6, 61 are arcuate guide rails 57, 58 extending around the head cylinder 11 and formed with guide grooves 59, 60, respectively. A supply leader 51 and a take-up leader 54 including respective pairs of tape guides 52, 53 and 55, 56 are slidably fitted in the guide grooves 59, 60, respectively.

The supply leader 51 and the take-up leader 54 are connected to the upper and lower ring gears 6, 61 by connectors 62, 63 shown in FIG. 11, respectively. Consequently, the ring gears 6, 61, when rotating in directions opposite to each other, move the leaders 51, 54 forward or rearward along the guide rails 57, 58.

As seen in FIGS. 12 and 20, the ring gears 6, 61 are coupled to the worm 35 through a gear mechanism 7. The gear mechanism 7 comprises first, second, third, fourth and fifth gears 71, 74, 77, 78, 79 arranged away from the worm 35 toward the ring gears 6, 61.

Each of these gears has uper and lower two gear portions. With the first to third gears 71, 74, 77, the upper gear portion and the lower gear portion rotate together, whereas in the case of the fourth gear 78 and the fifth gear 79, the upper gear portion 78a (79a) and the lower gear portion 78b (79b) are concentrically supported so as to rotate independently of each other and are connected to each other by a torsion spring 78c (79c).

The lower gear portion 72 of the first gear 71 is a worm wheel meshing with the worm 35, and the upper gear portion 73 thereof is in mesh with the lower gear portion 75 of the second gear 74. The upper gear portion 76 of the second gear 74 is in mesh with the upper gear portion 77a of the third gear 77, and the lower gear portion 77b of the third gear 77 is in mesh with the lower gear portion 78a of the fourth gear 78. The upper gear portion 78b of the fourth gear 78 is in mesh with the upper gear portion 79a of the fifth gear 79 and with the upper ring gear 6. The lower gear portion 79b of the fifth gear 79 is in mesh with the lower ring gear 61.

With reference to FIG. 20, the first gear upper portion 73 and the second gear lower portion 75 meshing therewith are each toothed locally along the outer periphery. The upper gear portion 73 is formed with an outwardly curved circular-arc face 73a along part of the addendum circle of the gear 73. The lower gear portion 75 is partly formed with a recessed circular-arc face 75a having substantially the same curvature as the circular-arc face 73a. These circular-arc faces 73a, 75a, engage with each other on completion of loading of the reel chassis 2 as seen in FIG. 21, thus providing an intermittent rotation mechanism.

Figure 24:
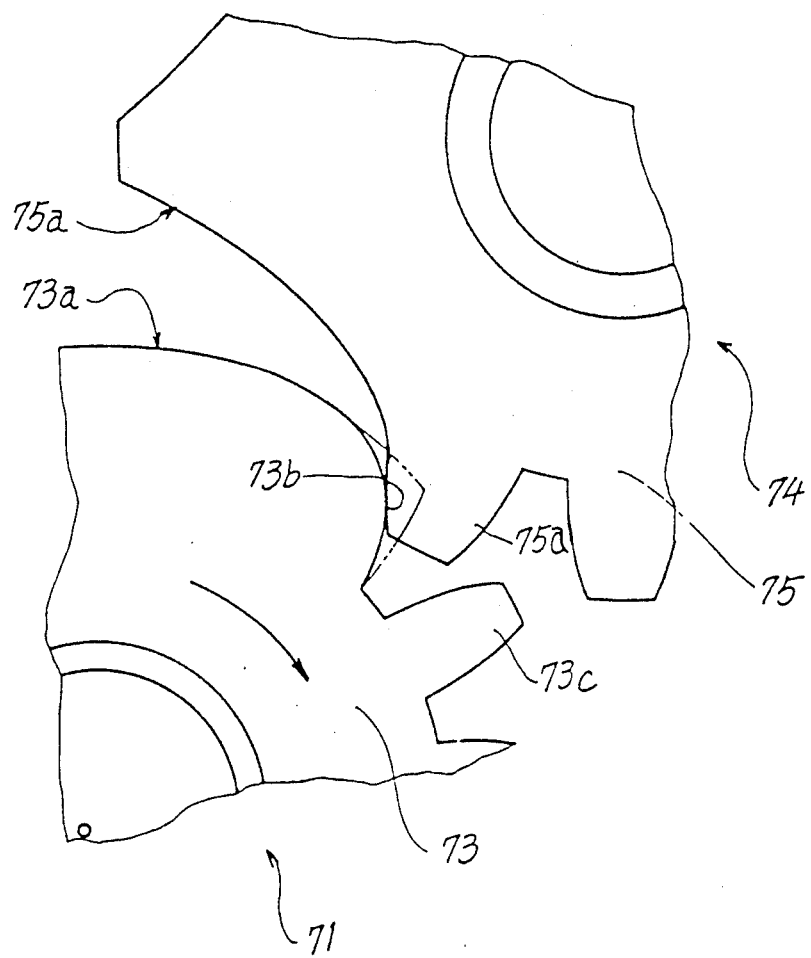
FIG. 24 is an enlarged plan view showing a pressing face of a first gear in engagement with a second gear.

With reference to FIG. 24, the rising face of the upper gear portion 73 extending from the bottom of the space defining the last tooth 73c into the outwardly curved circular-arc face 73a provides a pressing face 73b inclined toward the face 73a beyond the usual tooth contour indicated in a broken line, e.g. an involute. Accordingly, when the pressing face 73b of the upper gear portion 73 pushes the last tooth 75a of the second gear lower portion 75 to eventually rotate the second gear 74 through a small angle immediately before the completion of meshing between the upper gear portion 73 and the lower gear portion 75, a common normal of the two gear faces through the point of contact therebetween intersects a line through the centers of rotation of the two gears at a position which is closer to the first gear 71 than when usual two gear teeth mesh with each other. Consequently, the angular velocity ratio of the second gear 74 to the first gear 71 is lower than when the usual two gear teeth mesh with each other. This gives an increased torque to the second gear 74.

It is desired that the last tooth of the lower gear portion 75 of the second gear 74 have a profile in conformity with the pressing face 73b.

When the first gear 71 rotates clockwise in the standby mode of FIG. 20, the upper ring gear 6 is rotated clockwise through the second to third gears 74, 77, 78, thereby moving the supply leader 51 clockwise. On the other hand, the fifth gear 79 drives the lower ring gear 61 counterclockwise, thereby moving the take-up leader 54 counterclockwise.

Figure 5:
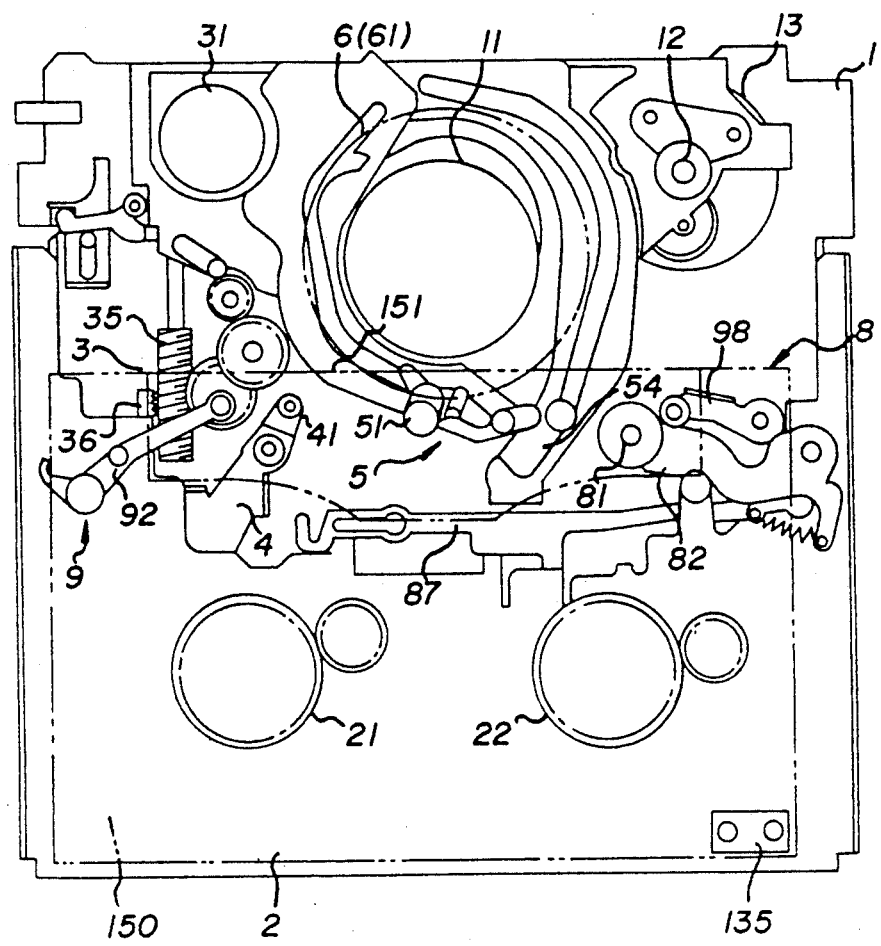
FIG. 5 is a plan view showing the main mechanisms of the VTR in the standby mode.

As a result, the supply leader 51 and the take-up leader 54 positioned inside the magnetic tape 151 of the cassette 150 in the standby mode, as shown in FIG. 5, move along the guide rails 57, 58, thereby withdrawing the tape from the cassette. While moving away from the cassette, the two leaders are thereafter held at their limit positions shown in FIG. 6 by coming into contact with respective stoppers 57a, 58a integral with the guide rail ends (FIG. 11). Consequently, the magnetic tape 151 around the periphery of the head cylinder 11 is wound through a predetermined angle (270 degrees), thereby completely loading the tape in place.

Figure 14:
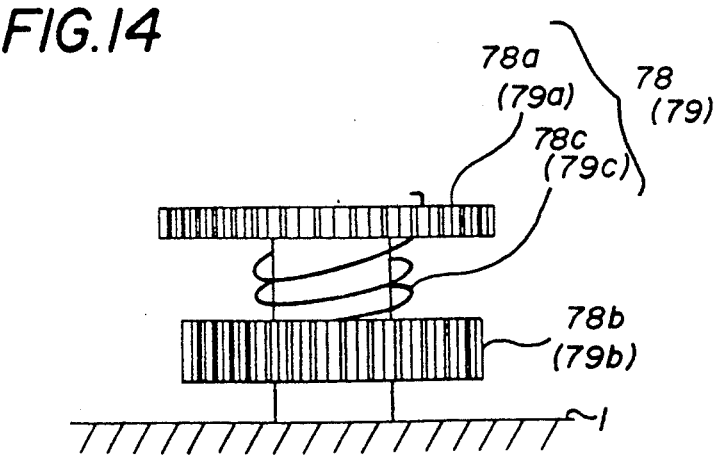
FIG. 14 is a front view of a fourth gear.

When the two leaders 51, 54 are brought into contact with the stoppers, the first gear 71 and the second gear 74 meshing with each other are in the state shown in FIG. 24. The loading motor 31 further rotates from this state, thereby bringing the pressing face 73b of the upper gear portion 73 of the first gear 71 into pressing contact with the lower gear portion 75 of the second gear 74 and giving an increased torque to the second gear 74 as already stated. The increased torque further operates the gear mechanism 7 to thereby elastically deform the torsion springs 78c, 79c shown in FIG. 14. The elastic force biases the upper gear portion 78b of the fourth gear 78 and the lower gear portion 79b of the fifth gear 79 into rotation, whereby the supply and take-up leaders 51, 54 are pressed against the respective stoppers 57a, 58a.

Even if the first gear 71 further rotates clockwise from the above state, the outwardly curved circular-arc face 73a of the first gear upper portion 73 comes into engagement with the recessed circular-arc face 75a of the second gear lower portion 75, so that the first gear 71 idly rotates without transmitting torque to the second gear 74 and the subsequent gears. At this time, the reaction of the torsion spring 79c acts to rotate the second gear 74 clockwise, but the second gear 74 will not rotate since the circular-arc faces 73a and 75a are in engagement with each other.

One of the important operations of the tape loading mechanism 5 as described is that the worm 35 can be drivingly rotated by the loading motor 31 after the tape has been completely loaded in place while the leaders 51, 54 are being held in their limit positions on the respective guide rails with the circular-arc face of the first gear 71 in engagement with the circular-arc face of the second gear 74. This makes it possible to convert the rotation of the worm 35 to an axial movement of the power shaft 34 to effect the operation of a pinch roller pressing mechanism 8, as will be described below.

PINCH ROLLER PRESSING MECHANISM 8

With reference to FIGS. 16 and 25 to 27, a pinch roller lever 82 carrying a pinch roller 81, and a drive lever 83 are supported on the same pivot on the reel chassis 2 at the right side thereof and are rotatable independently of each other. A spring 85 is connected between the two levers 82, 83.

The pinch roller 81 is provided upright on a free end of the pinch roller lever 82. The drive lever 83 has a cam follower 84 projecting downward from a free end thereof, and an engaging pin 83a positioned close to the cam follower 84. The cam follower 84 extends through an arcuate slot 28 formed in the reel chassis 2 and engages in a cam groove 86 on the main chassis 1. The engaging pin 83a is connected to one end of the slider 87 to be described later.

A take-up side withdrawing lever 98 is pivoted to the reel chassis 2 a distance away from the pivot for the pinch roller lever 82 and is connected to the lever 82 by a link 80. Projecting upward from the free end of the withdrawing lever 98 is a pin 97 for withdrawing the magnetic tape from the cassette in engagement therewith.

Figure 25:
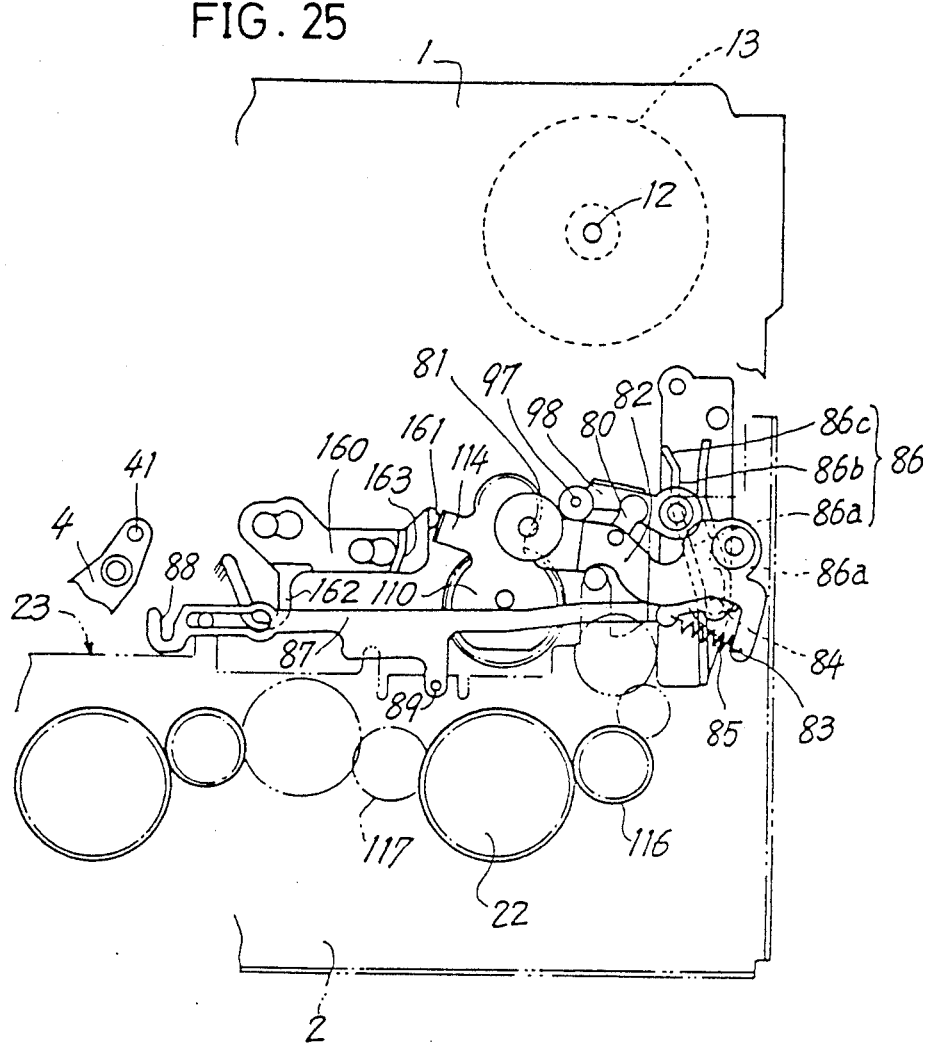
FIG. 25 is a plan view showing a pinch roller pressing mechanism in the standby mode.

With reference to FIG. 25, the cam groove 86 on the main chassis 1 is defined by a slanting drive face 86a extending along the direction of retraction of the reel chassis 2 as inclined toward the center of the main chassis 1, a parallel face 86b extending from the drive face 86a toward the capstan 12 in parallel to the retraction direction, and a release face 86c extending from the parallel face 86b as inclined toward the center of the main chassis.

Figure 26:
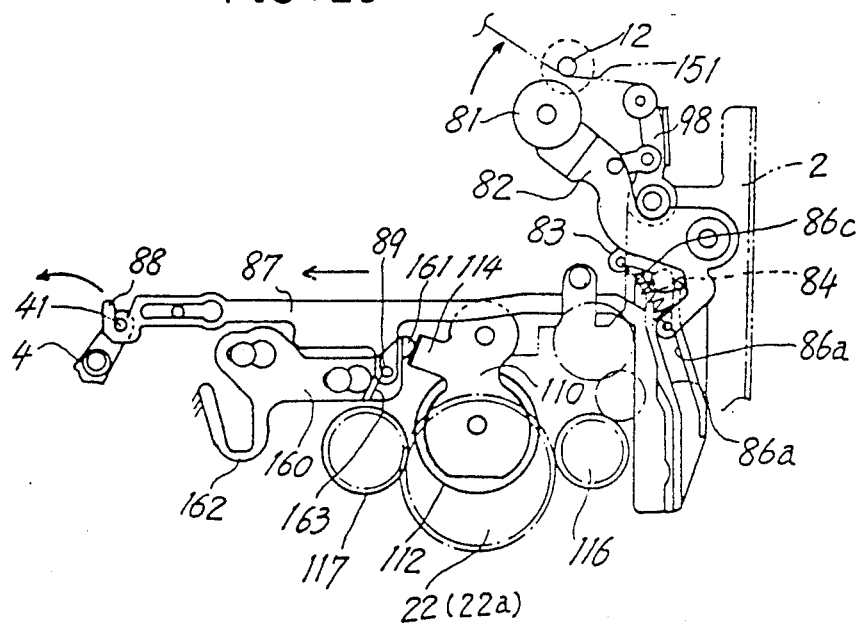
FIG. 26 is a plan view of the same in the ready mode.

Accordingly, in the course of the retraction from the standby-mode position shown in FIG. 25 to the loading completed position (ready mode) shown in FIG. 26, the cam follower 84 is pushed by the slanting drive face 86a defining the cam groove 86 to move the drive lever 83 clockwise, whereby the pinch roller lever 82 and the withdrawing lever 98 are moved clockwise.

When the loading of the reel chassis 2 has been completed, the pinch roller 81 is positioned at a small distance from the capstan 12 as seen in FIG. 26. At this time, the cam follower 84 is opposed to the release face 86c defining the cam groove 86 and is freed from the restraint, thereby rendering the drive lever 83 free to rotate clockwise.

Referring to FIGS. 16 and 25, the above-mentioned slider 87 is supported by the rear edge of the reel chassis 2 and extends along the cutout 23 of the chassis. The slider 87 is movable relative to the reel chassis 2 rightward and leftward over a specified distance. The slider 87 has connected to its right end the engaging pin 83a of the drive lever 83 and is provided at its left end with a hook 88 for engagement with a slider drive pin 41 on the mode lever 4 to be described below. Projecting downward from the midportion of the slider is a pin 89 for driving the restraining plate 160 to be described later.

Figure 22:
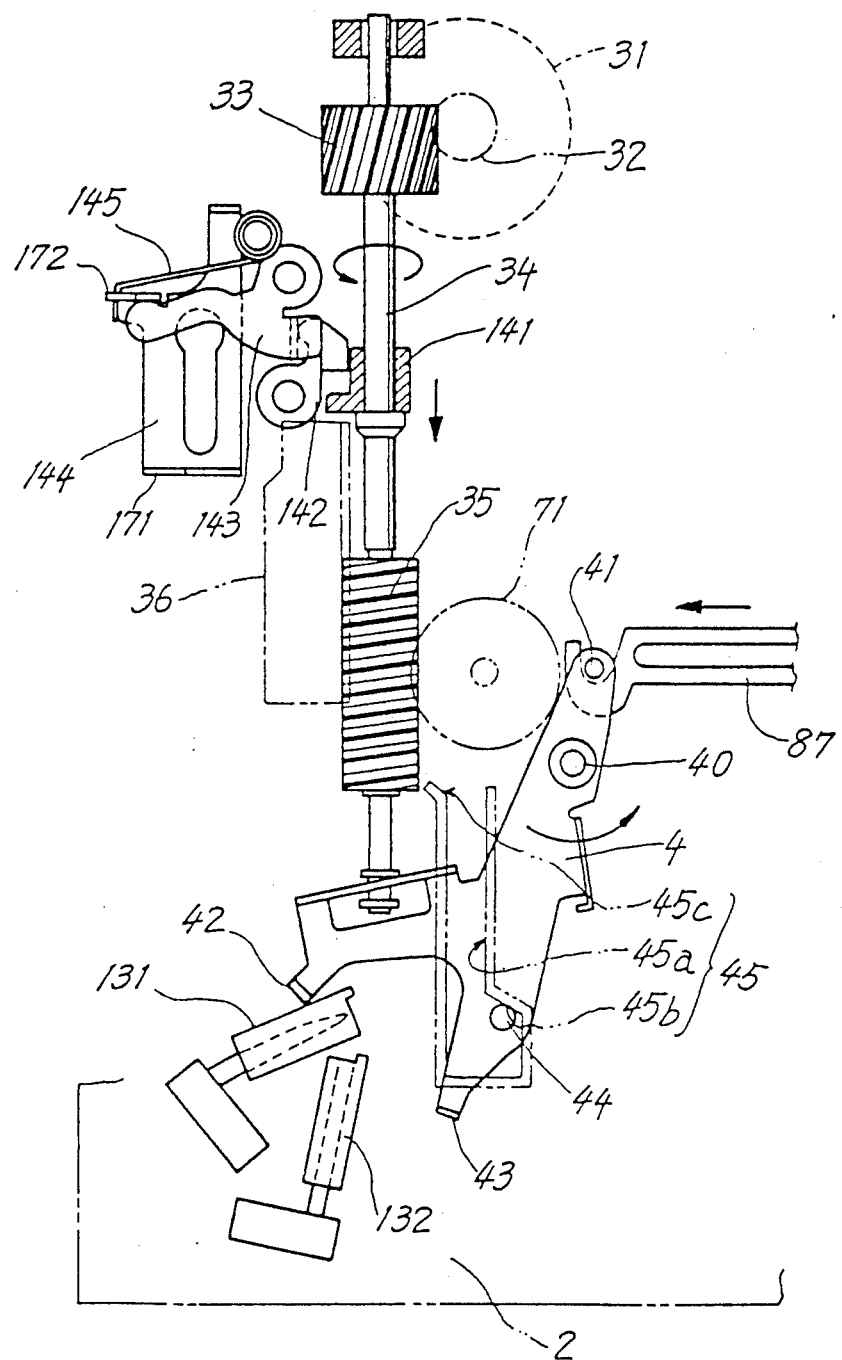
FIG. 22 is a plan view of the same in the play mode.
Figure 23:
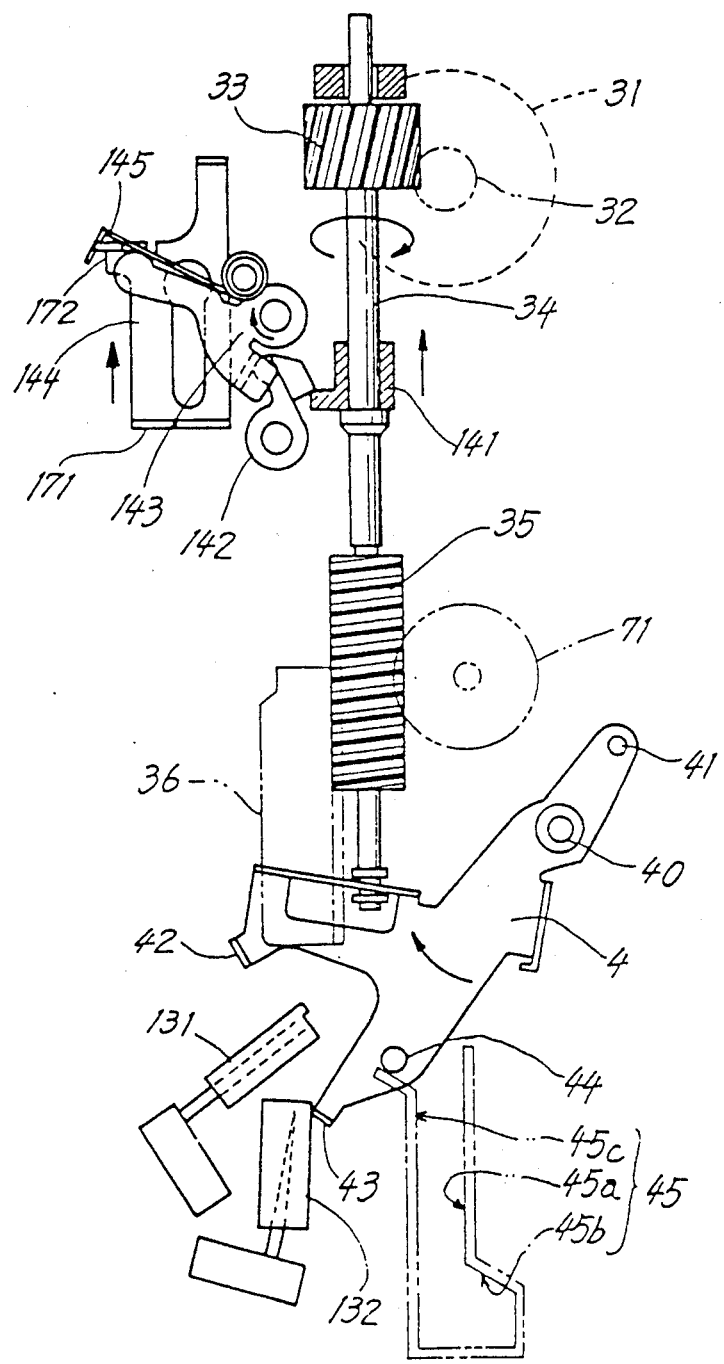
FIG. 23 is a plan view of the same in the eject mode.

With reference FIGS. 15, 22 and 23, the mode lever 4 is rotatably supported by a pivot 40 on the main chassis 1 and has one free end toward the center of the main chassis and carrying the slider drive pin 41 and the other free end which us bifurcated into a first projection 42 and a second projection 43 for actuating second and third sensor switches 131, 132, respectively. The mode lever 4 has a driven portion 46 in engagement with the power shaft 34 and loosely held between the pair of flanges 34a, 34b movably axially of the shaft 34. A roller 44 provided on the upper surface of the mode lever 4 in the vicinity of the second projection 43 is engaged in the guide channel 45 provided on the rear surface of the reel chassis 2, as shown in FIG. 19.

The guide channel 45 has a straight portion 45a for holding the mode lever 4 in a specified posture during the movement of the reel chassis 2, a first slanting face 45b for permitting counterclockwise rotation of the mode lever 4 upon the retraction of the reel chassis 2 to the loading completed position shown in FIG. 22, and a second slanting face 45c for permitting clockwise rotation of the mode lever 4 when the reel chassis 2 has been brought to the eject-mode position shown in FIG. 23.

When the power shaft 34 is further rotated in the direction of arrow by the operation of the loading motor 31 with the reel chassis 2 in the loading completed position as is shown in FIG. 21, the reel chassis 2 can no longer be retracted which results in the worm 35 is subjected to a thrust acting in the direction of ejection of the reel chassis (downward direction in FIG. 22) by meshing engagement with the rack 36 in a locked state, whereby the power shaft 34 is moved in the direction of ejection. Consequently, the mode lever 4 is driven counterclockwise, as shown in FIG. 22.

When the drive lever 83 rotates clockwise as already described with the retraction of the reel chassis 2 from the standby-mode position shown in FIG. 25, the slider 87 moves leftward with this movement. On completion of loading of the reel chassis, the hook 88 of the slider 87 engages the slider drive pin 41 on the mode lever 4, as shown in FIG. 26.

Figure 27:
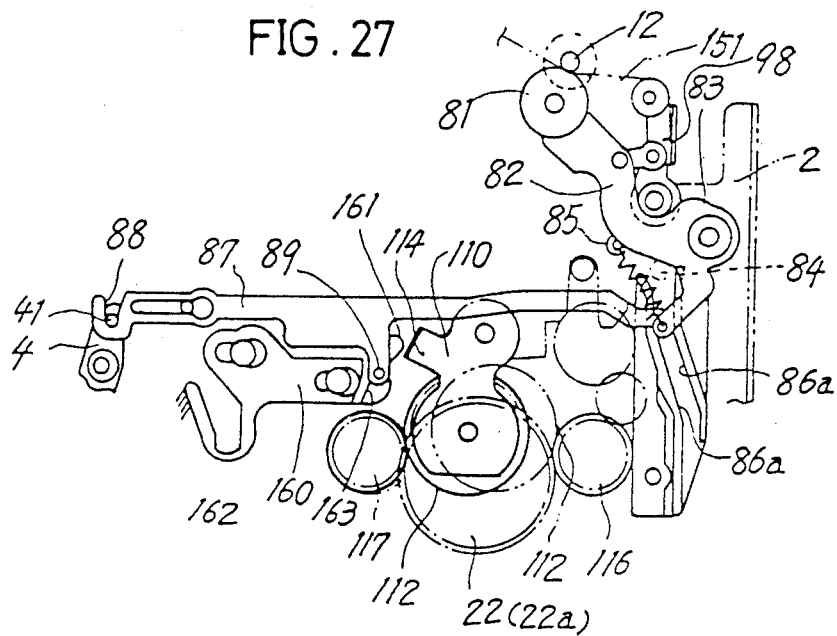
FIG. 27 is a plan view of the same in the play mode.

The axial movement of the power shaft 34 rotates the mode lever 4 from this state counterclockwise, thereby causing the slider drive pin 41 to slidingly move the slider 87 from the position of FIG. 26 to the position of FIG. 27. At this time, the roller 44 on the mode lever 4 is opposed to the first slanting face 45b of the guide channel 45, thereby permitting the counterclockwise rotation of the mode lever 4, as seen in FIG. 22.

The above movement drives the drive lever 83 and the pinch roller 82 clockwise from the position of FIG. 26. During this movement, the pinch roller 81 is brought into contact with the capstan 12 with the magnetic tape 151 interposed therebetween, and the slider 87 further moves slightly to thereby stretch the spring 85 connected between the drive lever 83 and the pinch roller lever 82. Under the action of the spring 85, the pinch roller 81 presses the tape 151 against the capstan 12. At this time, the drive lever 83 is free from restraint by the cam groove 86 and free to move clockwise.

On completion of the pinch roller pressing operation, the first projection 42 of the mode lever 4 actuates the second sensor switch 131 as shown in FIG. 22 to deenergize the loading motor 31.

When the loading motor 31 reversibly rotates with the parts in the state shown in FIG. 22, a thrust acting on the worm 35 upward in the drawing moves the power shaft 34 in the same direction, thereby moving the mode lever 4 clockwise.

At this time, the roller 44 on the mode lever 4 is in contact with the first slanting face 45b of the guide channel 45 on the reel chassis 2, thus, preventing the reel chassis 2 from moving toward the unloading direction, so that the reel chassis 2 will not be driven by the rotation of the worm 35.

Accordingly, the axial movement of the power shaft 34 first drives the mode lever 4 to the position of FIG. 21, thereby releasing the roller 44 on the mode lever 4 from the first slanting face 45b of the guide channel 45 to allow the movement of the reel chassis 2. The power of the worm 35 is thereafter delivered to the rack 36, thus initiating the reel chassis 2 into an unloading movement.

BACK TENSION LEVER MECHANISM 9

FIG. 16 shows a back tension lever mechanism 9 mounted on the reel chassis 2 at its left side. This mechanism comprises a back tension lever 92 pivotally supported on the reel chassis 2 and having a pin 91 opposed to the supply reel support 21 for engaging the magnetic tape within the cassette. The lever 92 has a cam follower 93 projecting downward therefrom and positioned close to the center of rotation thereof. The cam follower 93 extends through an arcuate slot 27 in the reel chassis 2 and engages in a cam groove 95 on the main chassis 1.

A spring 99 is provided between the back tension lever 92 and the reel chassis 2 for biasing the back tension lever 92 in an opening direction.

The cam follower 93 has attached to its base end one end of a brake band 94 wound around the supply reel support 21.

Figure 28:
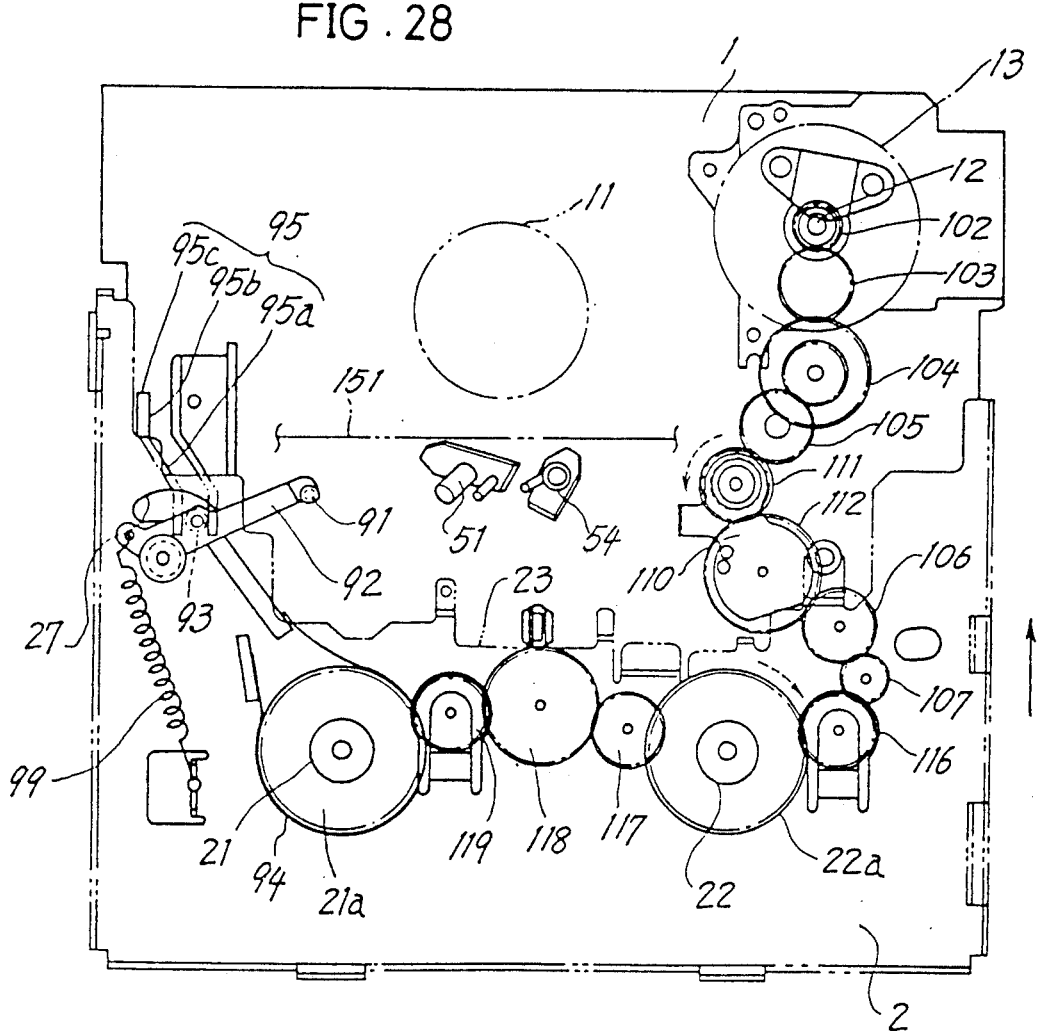
FIG. 28 is a plan view of a reel support drive mechanism in the standby mode.

With reference to FIG. 28, the cam groove 95 is defined by a slanting guide face 95a extending progressively away from the center of the main chassis toward the direction of retraction of the reel chassis 2, a parallel face 95b extending from the guide face 95a in parallel to the direction of retraction, and a release face 95c extending from the parallel face 95b generally at a right angle therewith outwardly of the chassis 1.

Figure 30:
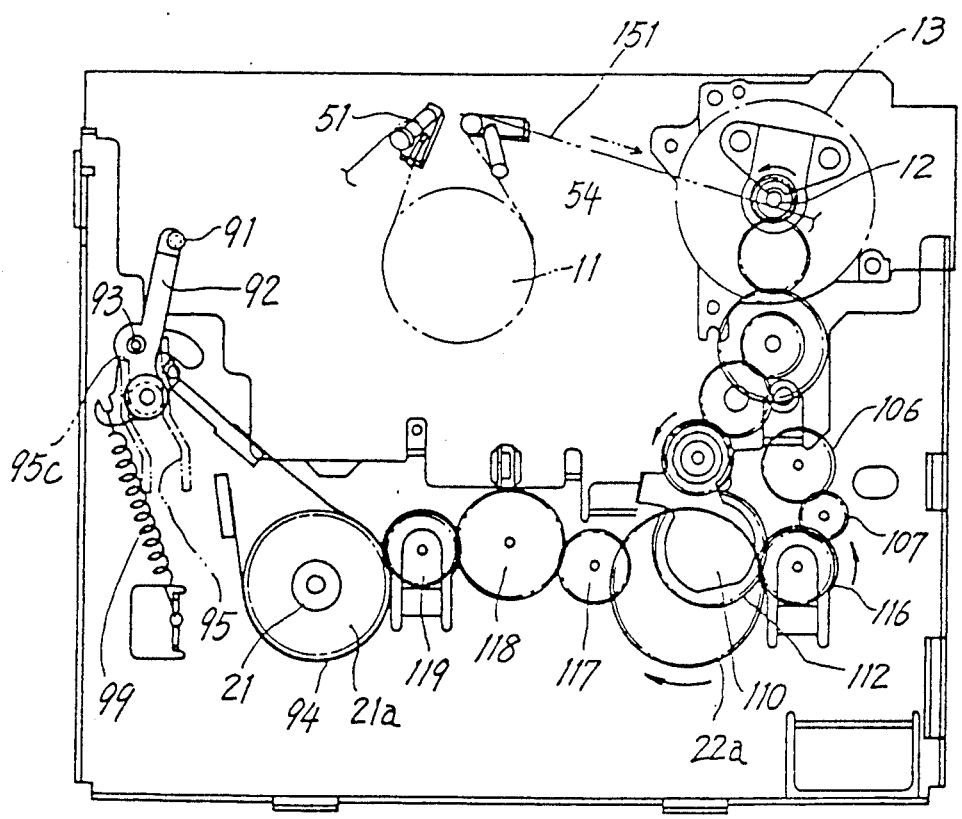
FIG. 30 is a plan view showing the reel support drive mechanism and a back tension lever mechanism during usual playback operation in the play mode.

Accordingly, with the retraction of the reel chassis 2 in the standby mode shown in FIG. 28, the cam follower 93 moves along the slanting guide face 95a defining the cam groove 95, thereby rotating the back tension lever 92 toward the biasing direction of the spring 99, i.e., counterclockwise as shown in FIG. 30, to cause the pin 91 to withdraw the magnetic tape 151 from the cassette.

Further with the rotation of the back tension lever 92, the brake band 94 comes into sliding contact with the periphery of the supply reel support 21. In this state, the pin 91 serves as a tension sensor to adjust the tension on the brake band 94; consequently, a suitable tension to the magnetic tape 151 is provided. At this time, the cam follower 93 is opposed to the release face 95c defining the cam groove 95 as shown in FIG. 30, rendering the back tension lever 92 free to rotate counterclockwise, i.e., in the tension imparting direction. In adjusting the tension, therefore, the cam follower 93 reciprocatingly moves between the release face 95c and a parallel face defining the cam groove and opposed to the release face 95c.

REEL SUPPORT DRIVE MECHANISM 100

With the present VTR, the torque of the capstan motor 13 is transmitted to the take-up reel support 22 or the supply reel support 21 to drive the reel support.

With reference to FIGS. 10 and 18, the main chassis 1 has mounted thereon a train of gears, 101, i.e., first, second, third and fourth gears 102, 103, 104, 105 which are arranged along the direction of from the capstan 12 toward the front edge of the chassis 1. The first gear 102 is fixed to the output shaft of the capstan motor 13.

Figure 13:
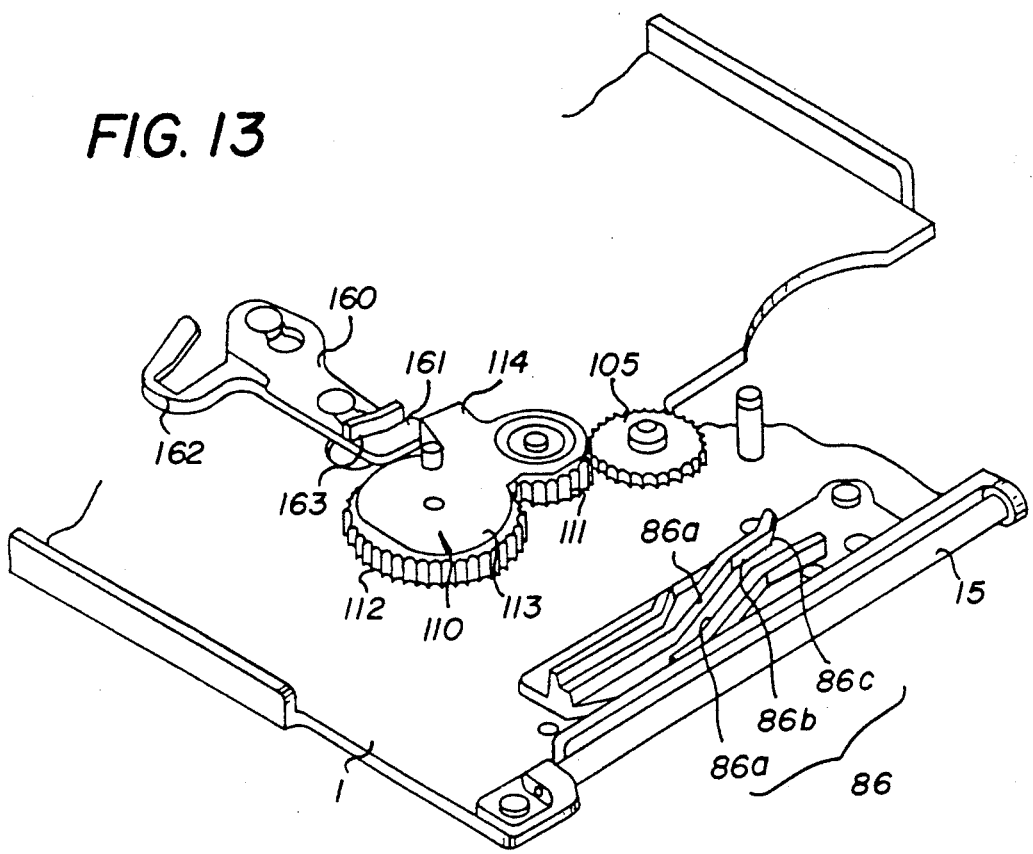
FIG. 13 is a perspective view of a swing idler and a restraining plate.

Further mounted on the main chassis 1 is a known swing idler 110 at the terminal end of the gear train 101. As shown in FIG. 13, the swing idler 110 comprises a support arm 113 supported by the rotary shaft of the drive gear 111 always in mesh with the fourth gear 105, an idler gear 112 mounted on the free end of the support arm and meshing with the drive gear 111 at all times, and a friction member (not shown) provided between the drive gear 111 and the support arm 113. The support arm 113 has a lug 114 projecting toward the center of the main chassis 1.

The aforementioned restraining plate 160 is supported on the central portion of the main chassis 1 and disposed beside the swing idler 110. The plate 160 is in the form of an integral piece of synthetic resin and slidable rightward or leftward over a specified distance. The restraining plate 160 has a protrusion 161 opposed to the lug 114 of the swing idler 110, and a cam wall 163 for the pin 89 on the slider 87 to engage with. The cam wall 163 has an oblique face inclined toward the swing idler 110 along the direction of retraction of the reel chassis. The restraining plate 160 is formed integrally with an elastic portion 162 for biasing the plate 160 toward the idler 110. The elastic portion has a forward end engaged with the main chassis 1.

With reference to FIGS. 19 and 28, the reel chassis 2 has on the rear surface of its right side a train of gears, i.e., a fifth gear 106, sixth gear 107 and reel drive gear 116 which are arranged along the direction of from the chassis cutout 23 end toward the take-up reel support 22. The reel drive gear 116 extends through the reel chassis 2 to project above the chassis upper surface and is in mesh with a gear portion 22a of the take-up reel support 22.

The reel chassis 2 is provided on the rear side of its central portion with a train of gears, i.e., a first intermediate gear 117, second intermediate gear 118 and reel drive gear 119 which are arranged toward the direction of from the reel drive gear 116 toward the supply reel support 21. The reel drive gear 119 extends through the reel chassis 2 to project above the chassis upper surface and is in mesh with a gear 21a on the supply reel support 21.

When the capstan 12 rotates counterclockwise, i.e., in the tape take-up direction; i.e., in the standby mode of FIG. 28, the idler 110 swings counterclockwise with this movement, thereby bringing the idler gear 112 into meshing engagement with the fifth gear 106 on the reel chassis 2.

Consequently, the rotation of the capstan motor 13 is transmitted to the take-up reel support 22 via the idler 110, fifth gear 106, sixth gear 107 and reel drive gear 116 to rotate the reel support 22 and wind up the tape.

Figure 29:
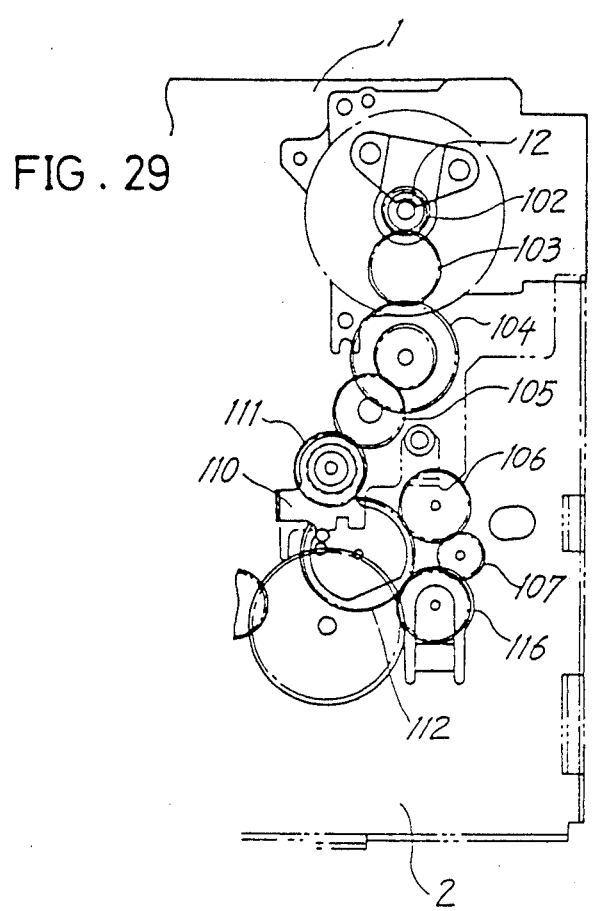
FIG. 29 is a plan view showing the same during loading operation.

When the reel chassis 2 is retracted from the position of FIG. 28 toward the head cylinder 11, the idler gear 112 on the swing idler 110 meshes with both the fifth gear 106 and the reel drive gear 116 during the retraction as seen in FIG. 29. Upon further retraction of the reel chassis 2 to the loading completed position, the idler gear 112 moves out of engagement with the fifth gear 106 and remains in engagement with the reel drive gear 116 only as shown in FIG. 30.

Further, during the retraction of the reel chassis 2, the pin 89 on the slider 87 comes into contact with the cam wall 163 of the restraining plate 160, thus slightly moving the restraining plate 160 against the elastic portion as shown in FIGS. 25 and 26. In the state shown in FIG. 26, the protrusion 161 on the restraining plate 160 has been slightly advanced into the path of swing of the idler 110 and is in contact with the lug 144 of the idler 110, thereby preventing the idler 110 from clockwise rotation. Consequently, the idler gear 112 is held out of mesh with the first intermediate gear 117.

Further, in the state shown in FIG. 26, the capstan 12 is in clockwise rotation, i.e., in the tape rewinding direction, thereby exerting a clockwise swinging force on the idler 110, so that the idler gear 112 will not mesh with the reel drive gear 116.

Consequently, the idler gear 112 is held in a neutral position out of meshing engagement with the first intermediate gear 117 for the supply reel support and with the reel drive gear 116 adjacent the take-up reel support.

The idler gear 112 is set in the neutral position to render the two reel supports free to rotate and permit the magnetic tape to be paid off from the two reels during the loading of the reel chassis 2. The magnetic tape is paid off from the reels to preclude damage thereto due to the substantial amount friction between the tape and head cylinder because the tape is wound around the head cylinder through a large angle.

During the subsequent retraction of the reel chassis 2 from the position in FIG. 26 to the play-mode position in FIG. 27, the slider 87 moves leftward, causing the pin 89 to move the restraining plate 160 leftward by pushing the cam wall 163 on the plate 160. As a result, the protrusion 161 of the restraining plate 160 moves away from the swing idler 110 to permit the idler 110 to swing sidewise.

When the capstan 12 rotates counterclockwise in the state of FIG. 30, the take-up reel support 22 is driven clockwise to wind up the tape for usual playback or fast forwarding.

Figure 31:
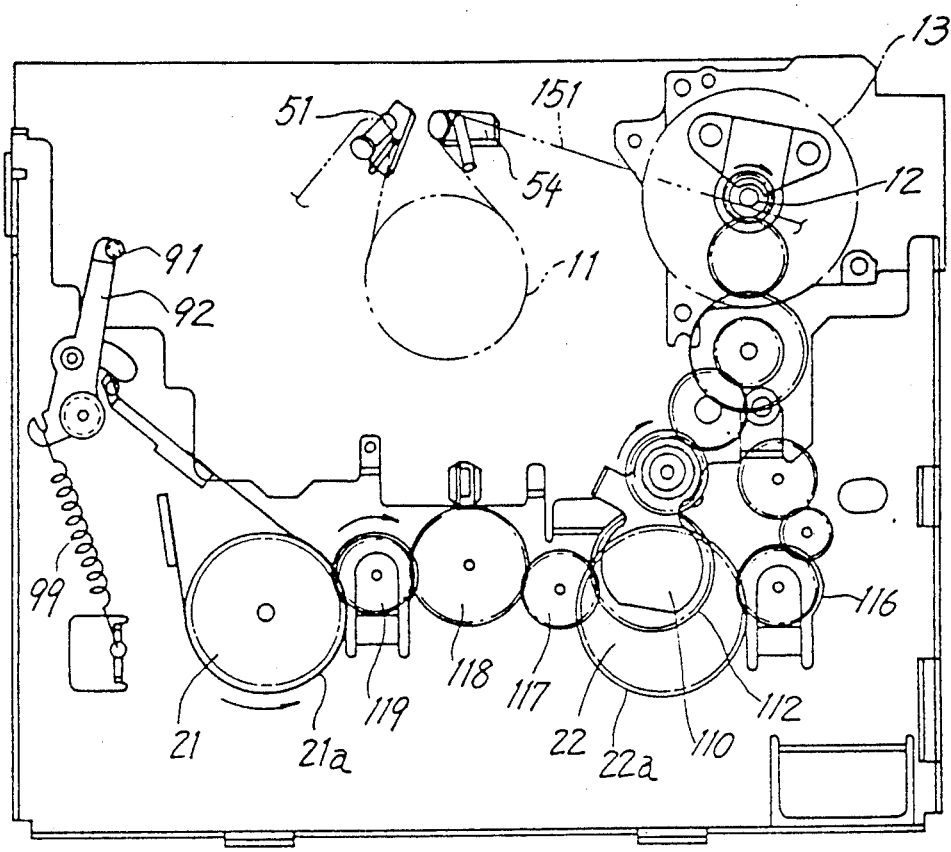
FIG. 31 is a plan view of the same in the play mode during reverse playback.

When the capstan rotates clockwise, the swing idler 110 swings clockwise, thereby moving the idler gear 112 away from the reel drive gear 116 into meshing engagement with the first intermediate gear 117 coupled to the supply reel support 21 as shown in FIG. 31. The clockwise rotation of the idler gear 112 is transmitted to the gear 21a on the supply reel support 21 via the first intermediate gear 117, second intermediate gear 118 and reel drive gear 119, whereby the supply reel support 21 is driven counter-clockwise to take up the tape for reverse playback or rewinding.

HOLDER LIFT MECHANISM 120

With reference to FIGS. 17, and 32 to 34, the cassette holder 20 is supported by a holder lift mechanism 120 at opposite sides of the reel chassis 2.

The holder lift mechanism 120 comprises a pair of opposed link assemblies arranged at the respective opposite sides of the cassette holder 20. Each link assembly comprises a first arm 123 and a second arm 124 intersecting each other and connected together at the intersection rotatably relative to each other. The base end of the first arm 123 close to the cassette inlet 10 is rotatably fitted in a support hole 20a formed in the side plate of the cassette holder 20. The other end of the first arm 123 is slidably fitted in a horizontally elongated guide slot 127 formed in the side plate of the reel chassis 2. The base end of the second arm 124 close to the cassette inlet 10 is rotatably fitted in a support hole 126 formed in the side plate of the reel chassis 2. The other end of the second arm 124 is slidably fitted in a horizontally elongated guide slot 20b formed in the slide plate of the cassette holder 20.

A spring 125 is connected between the first and second arms 123 and 124.

Thus, the cassette holder 20 is liftably supported on the reel chassis 2 and biased upward.

HOLDER LOCK MECHANISM 140

Figure 32:
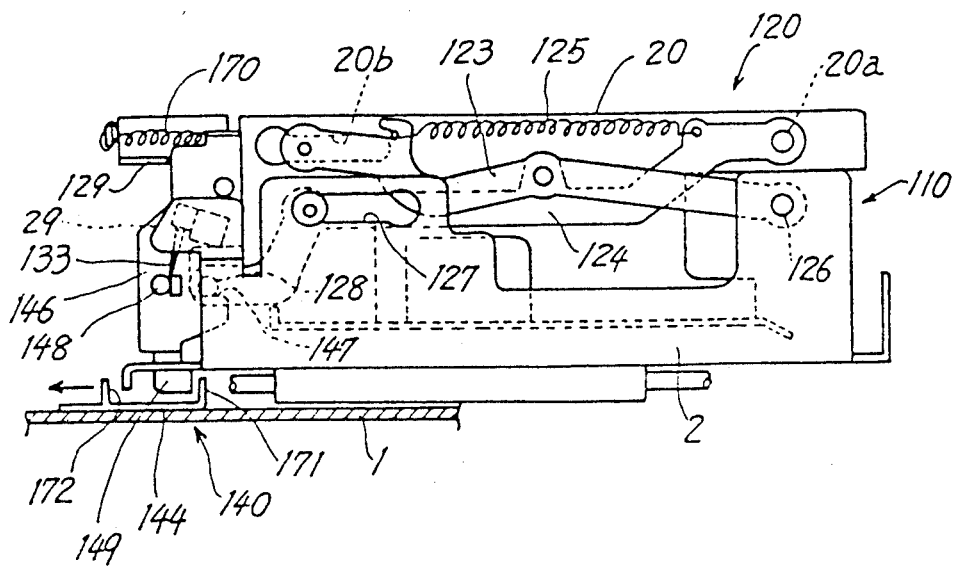
FIG. 32 is a left side elevation of a holder lock mechanism in the standby mode.
Figure 33:
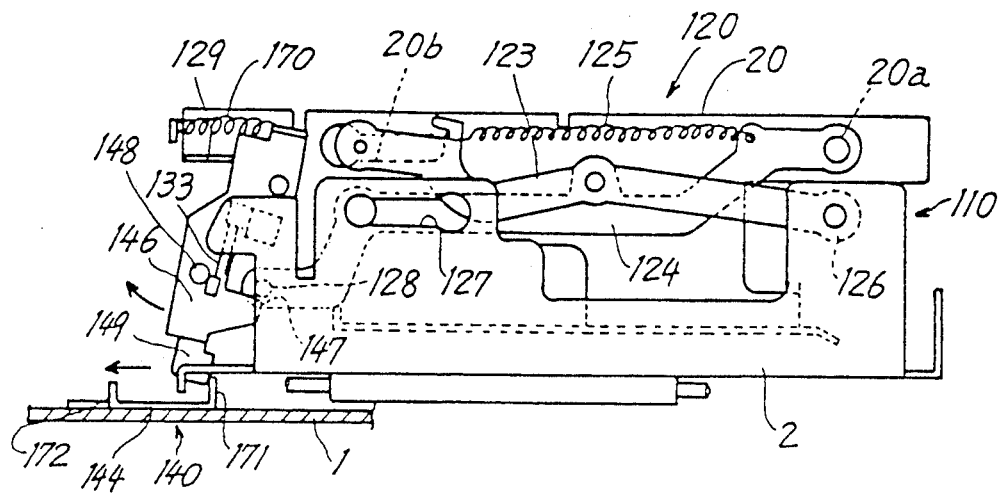
FIG. 33 is a left side elevation of the same to show an unlocking operation.
Figure 34:
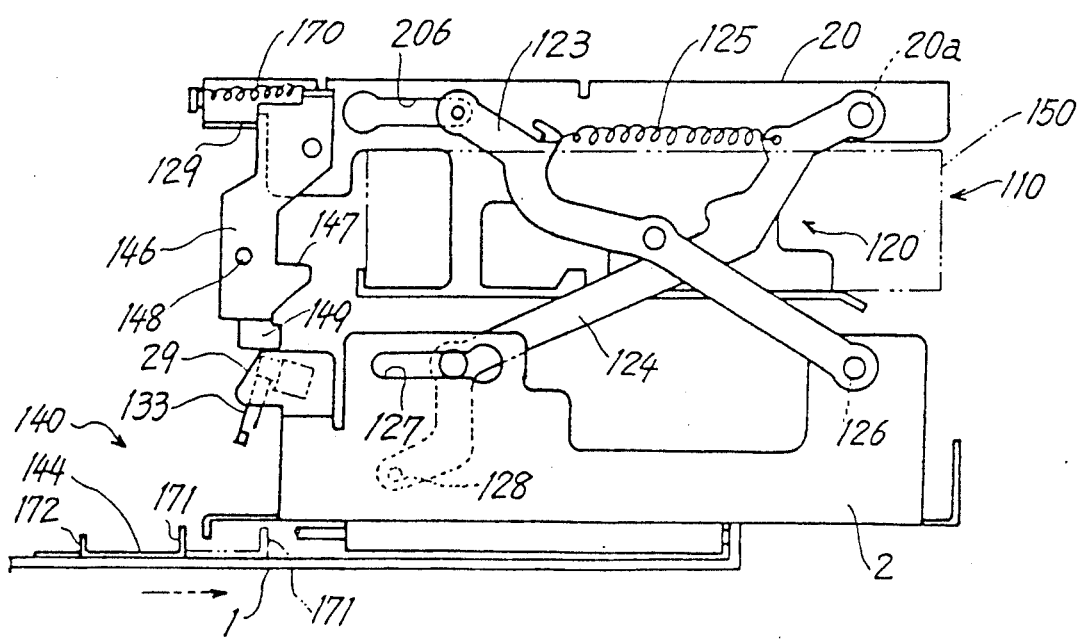
FIG. 34 is a left side elevation of the same in the eject mode.

With reference to FIGS. 32 to 34, the left link assembly of the holder lift mechanism 120 has coupled thereto a holder lock mechanism 140 for locking the cassette holder 20 in its lowered position.

To provide the holder lock mechanism 140, the slidable end of the first arm 123 is extended toward the main chassis, and the extremity of the extension has a lock pin 128 projecting inwardly of the holder.

On the other hand, a lock arm 146 is pivoted to the left side plate of the cassette holder 20 at one end thereof opposite to the cassette inlet 10 and is biased counterclockwise, as shown in FIG. 34, by a spring 170 connected between the arm 146 and the reel chassis 2. The lock arm 146 is provided at its free end with a hook 147 engageable with the lock pin 128 and an outwardly projecting pressing pin 148 in the vincinity of the hook 147. The lock arm 146 is prevented from moving counterclockwise beyond a limit position by a stopper 129 provided on the cassette holder 20.

The rear end of the reel chassis side plate is formed with a cam portion 29 slanting rearwardly downward and opposed to the pressing pin 148 on the lock arm 146.

Accordingly, when the cassette holder 20 is depressed in the eject mode of FIG. 34, the pressing pin 148 comes into contact with the cam portion 29, which in turn slightly rotates the lock arm 146 clockwise. At the same time, the first arm 123 rotates toward a horizontal position. When the cassette holder 20 is further depressed to its lowered limit position, the pressing pin 148 is released from the cam portion 29, whereupon the lock arm 146 is rotated counterclockwise by the action of the spring 170 as shown in FIG. 32. Consequently, the hook 147 of the lock arm 146 engages with the lock pin 128 on the first arm 123 to lock the holder 20 in its lowered limit position.

The cam portion 29 is provided on its inner surface with a fourth sensor switch 133 as positioned below the pressing pin 148. With the cassette holder 20 in its locked position, the switch is closed by the pressing pin 148 as seen in FIG. 32 to detect the locked state of the holder, whereupon the reel chassis is initiated into loading movement.

HOLDER UNLOCKING MECHANISM

The holder lock mechanism 140 is unfastened by moving a slide plate 144 on the main chassis 1 to thereby move the lock arm 146 counterclockwise and disengage the hook 147 from the lock pin 128.

With reference to FIGS. 21 and 23, the slide plate 144 is disposed at one side of the power shaft 34 and is slidable over a specified distance along the direction of movement of the reel chassis 2. The plate 144 is biased toward the reel chassis 2 by a torsion spring 145 on the main chassis 1. The slide plate 144 has, at one end thereof adjacent to the reel chassis 2, a first lug 171 which is engageable with the lock arm 146 and, at the other end, a second lug 172 which is engageable with one or two free ends of a driven lever 143.

The driven lever 143 and a drive lever 142 are pivotally supported on the main chassis 1. The slide plate 144 is operatively connected to the aforementioned drive piece 141 fitted around the power shaft 34, through these levers 143, 142. The drive lever 142 is formed at its free end with a pair of engaging portions which are in a back-to-back arrangement. One of these engaging portions is in contact with the drive piece 141, and the other engaging portion with the other free end of the drive lever 143. The first-mentioned free end of the drive lever 143 extends over the slide plate 144 and bears against the second lug 172 of the slide plate 144.

When the power shaft 34 is rotated in the direction of arrow as shown by the operation of the loading motor 31 after the reel chassis 2 has been completely unloaded in FIG. 20, the reel chassis 2 no longer advances, with the result that the worm 35 is subjected to a thrust acting in the direction of retraction of the reel chassis (upward in FIG. 20) by the rack 36 in a locked state and meshing with worm 35, whereby the power shaft 34 is moved in the direction of retraction. Consequently, the mode lever 4 is driven clockwise as shown in FIG. 23. At this time, the roller 44 on the mode lever 4 is opposed to the second slanting face 45c of the guide channel 45 to permit the clockwise rotation of the mode lever 4.

With the above axial movement of the power shaft 34, the drive piece 141 drives the drive lever 142 counterclockwise as shown in FIG. 23, and the drive lever 142 in turn drives the driven lever 143 clockwise, thereby causing the driven lever 143 to move the slide plate 144 toward the direction of reel chassis against the spring 145.

With this movement, the first lug 171 pushes the free end 149 of the lock arm 146 to move the arm 146 clockwise as seen in FIG. 33, thereby disengaging the hook 147 from the lock pin 128 and unlocking the cassette holder 20. Consequently, the cassette holder 20 is raised by the action of each spring 125 as seen in FIG. 34. At the same time, the lock arm 146 is returned counterclockwise to its limit position.

The slide plate 144 is thereafter returned toward the reel chassis 2 to the broken-line position shown in FIG. 34, as will be described below, whereby the lock mechanism is made ready for the subsequent operation.

When the power shaft 34 in the state of FIG. 23 is rotated in a direction opposite to the direction of arrow by the operation of the loading motor 31, a thrust acting on the worm 35, downward in the drawing, moves the power shaft 34 in the same direction. This movement returns the mode lever 4 to the position of FIG. 20 and the slide plate 144 to the position shown in FIG. 32.

In the state of FIG. 23, the roller 44 on the mode lever 4 is in contact with the second slanting face 45c of the guide channel 45 on the reel chassis, thereby preventing the reel chassis from retraction, so that the rotation of the worm 35 will not move the reel chassis.

Consequently, the power shaft 34 first moves axially thereof to drive the mode lever 4 to the position shown in FIG. 20. The roller 44 on the mode lever 4 moves away from the second slanting face 45c of the guide channel 45, thus permitting the movement of the reel chassis 2. The torque of the worm 35 is then delivered to the rack 36, so as to initiate the reel chassis 2 into loading movement.

HOLDER POSITION MECHANISM

The holder positioning mechanism to be described below is used for holding the cassette holder 20 at a specified level above the main chassis 1 in the state shown in FIG. 32.

With reference to FIGS. 9, 10 and 17, the right side plate of the cassette holder 20 has an engaging pin 121 projecting outward from its rear end.

On the other hand, the main chassis 1 has at the rear end of its right side portion a U-shaped hooked piece 122 which is opened toward the front. The hooked piece 122 is so positioned that the engaging pin 121 snugly fits therein when the reel chassis 2 has been completely loaded as shown in FIG. 4.

Thus, the left side plate of the cassette holder 20 is held at the specified level above the main chassis 1 by the engagement of the lock arm 146 with the lock pin 128 in the state as shown in FIG. 28 and remains so held also on completion of loading and in the play mode as shown in FIG. 4. The right side plate of the cassette holder 20 is also held at the specified level by the engagement of the engaging pin 121 with the hooked piece 122 as seen in FIG. 4.

Consequently, the tape cassette within the cassette holder 20 is maintained horizontally at the specified level above the main chassis 1 in the play mode.

The engaging pin 121 is electrically connected to the cassette holder 20, and the hooked piece 122 is electrically connected to the main chassis 1, whereby the cassette holder 20 is grounded to the main chassis 1 to magnetically shield the interior of the cassette holder 20. Consequently, the magnetic head and rotary transformer of the head cylinder 11 to be surrounded by the holder 20 in the play mode are protected from external magnetic noises.

OTHER COMPONENTS

With reference to FIG. 8, the reel chassis 2 is provided at the front edge of its midportion with a reel unlocking piece 26 for unfastening a reel lock mechanism (not shown) provided inside the cassette.

The reel chassis 2 is further provided with a light-emitting member 134 at the rear edge of its midportion and with a tape end sensor 136 and a tape top sensor 137 on its respective side plate for receiving light from the member 134 to thereby detect whether the magnetic tape in the cassette inside the holder 20 in the play mode has been wound up on the take-up reel completely (tape end state) or rewound on the supply reel completely (tape top state).

With reference to FIG. 9, the second arm 124 on the right side constituting the holder lift mechanism 120 has a circular-arc gear piece 173 projecting therefrom. The reel chassis 2 is provided with a damper 174 meshing with the gear piece 173 for offering suitable resistance to the rise of the cassette holder 20.

As seen in FIG. 19, the reel chassis 2 has a supply reel rotation sensor 138 and a take-up reel rotation sensor 139 disposed on the rear side of and opposed to the supply reel support 21 and the take-up reel support 22, respectively, for detecting the rotation of the respective reels. The rotation sensor 138, 139 each comprises, for example, a photoreflector.

CIRCUIT CONSTRUCTION

FIG. 35 shows the construction of a control circuit for controlling the operation of the capstan motor 13 and the loading motor 31.

A system controller 180 for controlling the operation of the VTR in various modes comprises a microcomputer and has connected to its input ports the foregoing first to fourth sensor switches 130, 131, 132, 133, 134, a cassette detection switch 135, the tape end sensor 136, the tape top sensor 137, the supply reel rotation sensor and the take-up reel rotation sensor 139. Drivers 13a, 31a are connected to the output ports of the controller 180 for producing drive voltage for the capstan motor 13 and the loading motor 31, respectively.

The system controller 180 has stored therein a computer program for effecting the mode changes, to be described below, in response to command signals from manipulation keys (not shown) on the operation panel of the VTR, and also a computer program for performing the operations unique to the VTR of the invention and to be described below with reference to FIGS. 36 to 40.

MAIN MODE CHANGES

The present VTR is settable in five modes. These modes include eject mode wherein the cassette holder is raised for the tape cassette to be placed therein; standby mode wherein the reel chassis depressed in the eject mode is locked to the reel chassis; play mode wherein signals can be recorded or reproduced after the reel chassis has been loaded in place from the standby-mode position, followed by tape loading; pressing of the pinch roller against the capstan, etc.; stop mode wherein the head cylinder and the capstan rotating in the play mode are stopped; and ready mode wherein the pinch roller pressed against the capstan in the play mode or stop mode is released from the capstan.

(1) Change from Standby Mode to Ready Mode (Loading Completed State)

In the standby mode wherein the cassette holder 20 is locked to the reel chassis 2 as shown in FIG. 3, a loading command is given by the operation panel, whereupon the loading motor 31 is initiated into rotation, retracting the reel chassis 2 from the standby-mode position of FIG. 5 to the loading completed position of FIG. 5, whereby the first sensor switch 130 is actuated as seen in FIG. 21.

Figure 6:
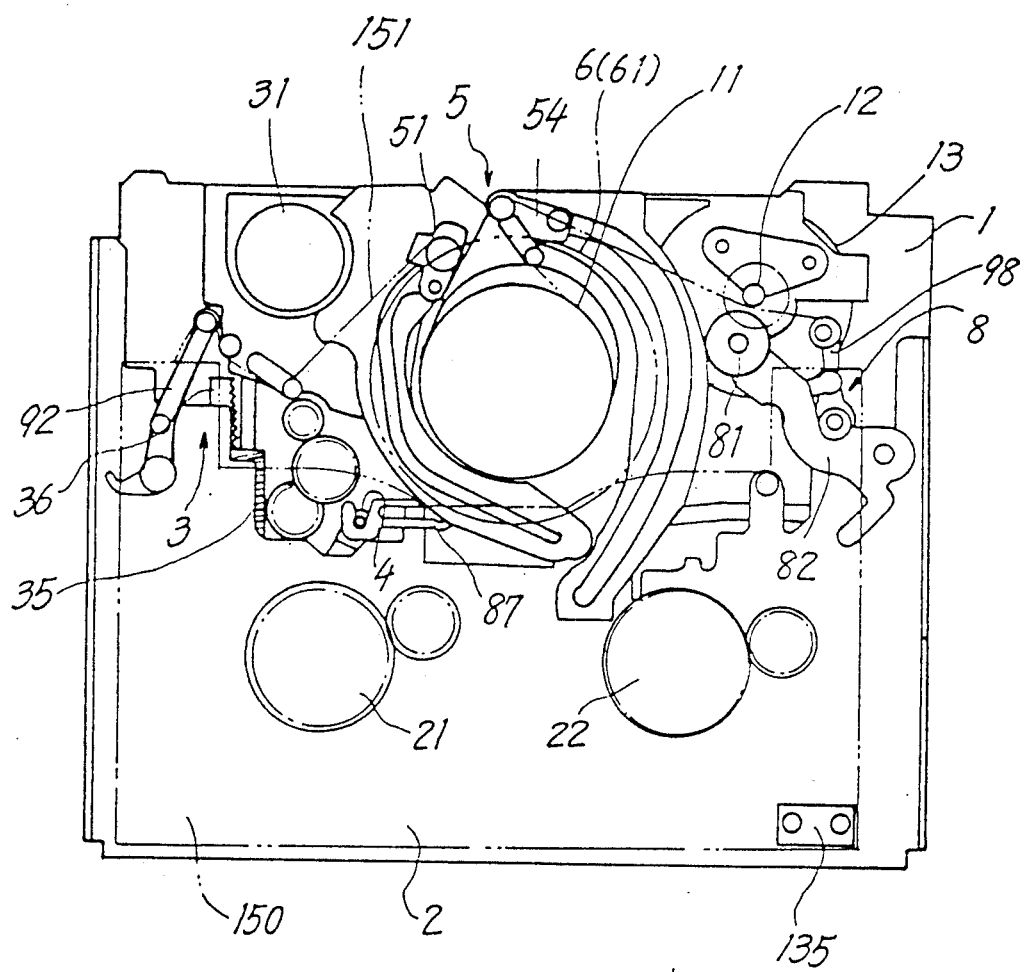
FIG. 6 is a plan view of rhe same in a ready mode.

In this step, the back tension lever 92, the take-up side withdrawing lever 98 and the pinch roller lever 82 are moved toward the tape withdrawing direction, and the supply and take-up leaders 51, 54 are moved, whereby the magnetic tape 151 is positive along the specified path as shown in FIG. 6. Further the mode lever 4 and the slider 87 engage with each other.

(2) Change from Ready Mode to Play Mode

Figure 7:
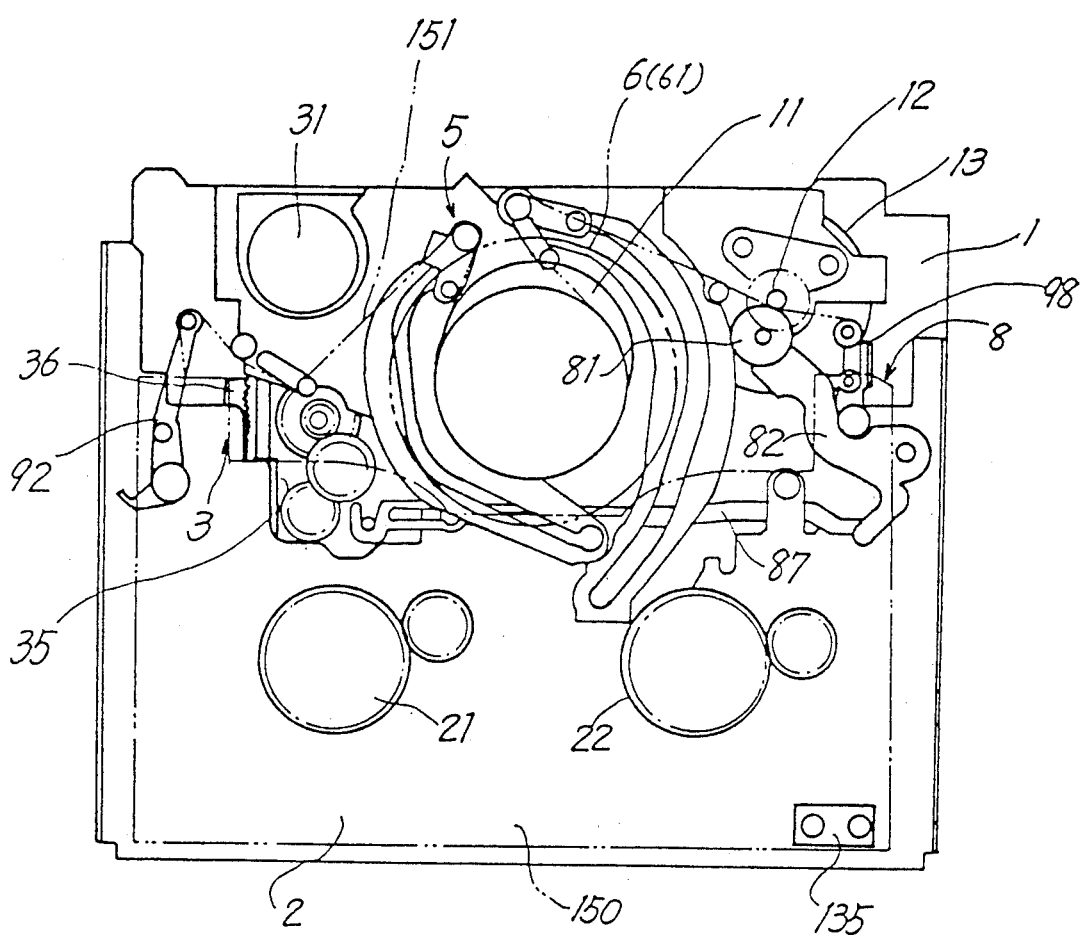
FIG. 7 is a plan view of the same in the play mode.

Further continued rotation of the loading motor 31 in the ready mode of FIG. 6 moves the power shaft 34 axially thereof from the position as shown in FIG. 21 to the position of FIG. 22, thereby causing the mode lever 4 pull the slider 87 to so as to bring the pinch roller 81 into pressing contact with the capstan 12 with the tape 151 positioned therebetween as seen in FIG. 7.

Consequently, the second sensor switch 131 is turned on as shown in FIG. 22, and the ON signal is sent to the system controller to stop the loading motor 31.

The head cylinder 11 and the capstan motor 13 rotate in the play mode of FIG. 7 to record or reproduce signals.

Further in the play mode, the capstan 12 is rotated at an increased speed to forward the tape fast or rewind the tape.

(3) Change from Play Mode to Stop Mode

In response to a command given by the operation panel for a change to the stop mode, the head cylinder 11 and the capstan 12 stop rotating. The reel chassis 2 remains in the position as shown in FIG. 7.

(4) Change from Play Mode or Stop Mode to Ready Mode

For example, when a slack has occurred in the tape between the capstan and the head cylinder during tape rewinding, as will be described later, the VTR is set in the ready mode in which the pinch roller is released from pressing contact with the capstan as shown in FIG. 6.

In this case, the operation of the loading motor 31 drives the power shaft 34 axially thereof from the position in FIG. 22 to the position in FIG. 21. This movement moves the slider rightward from the position of FIG. 27 to the position of FIG. 26, thus freeing the pinch roller 81 from pressing contact with the capstan 12. This is detected by the opening of the first sensor switch 130 in FIG. 21, and the loading motor 31 is stopped by the resulting detection signal.

(5) Change from Ready Mode to Standby Mode

The rotation of the power shaft 34 in a direction opposite to the arrow in the state as shown in FIG. 21 drives the reel chassis 2 to the standby-mode position of FIG. 20.

Further, the first gear 71, when rotated counterclockwise by the rotation of the worm 35 in the state as shown in FIG. 21, moves the outwardly curved circular-arc face 73a of the upper gear portion 73 of the gear 71 out of contact with the recessed circular-arc face 75a of the lower gear portion of the second gear 74, thus permitting the upper and lower gear portions 73, 75 to come into meshing engagement with each other. As a result the rotation of the worm 35 is transmitted to the two ring gears 6, 61 via the gear mechanism 7, thereby returning the supply and take-up leaders 51, 54 from the position as shown in FIG. 6 to the tape loading start position within the cassette 150 as shown in FIG. 5.

Simultaneously, the supply side and take-up side withdrawing levers 92, 98 and the pinch roller lever 82 are also returned to the tape loading start position inside the cassette.

Concurrently with the return of the leaders 51, 54, the take-up reel support 22 is driven in the tape winding direction, as will be described later, whereby the magnetic tape 151 drawn out toward the head cylinder 11 is rewound into the cassette.

The reel chassis 2 moves form the standby-mode position to the subsequent eject-mode position without stopping in the former mode.

(6) Change from Standby Mode to Eject Mode

The power shaft 34, when rotated in a direction opposite to the arrow in the standby mode as shown in FIG. 20, moves axially thereof as shown in FIG. 23, thereby moving the slide plate 144 against the torsion spring 145, with the result that the cassette holder 20 is unlocked and rises as seen in FIGS. 32 to 34.

The eject mode shown in FIG. 23 is detected 100 msec after the third sensor switch 132 is closed. The loading motor 31 is stopped in response to the resulting detection signal.

UNIQUE OPERATIONS

(1) Tape Slack Treating Process

If the magnetic tape stops in contact with the periphery of the head cylinder owing to the friction therebetween during tape rewinding, the tape slackens between the cylinder and the capstan. To remedy the slack, the operation illustrated in FIG. 38 is conducted according to a program.

Figure 38:
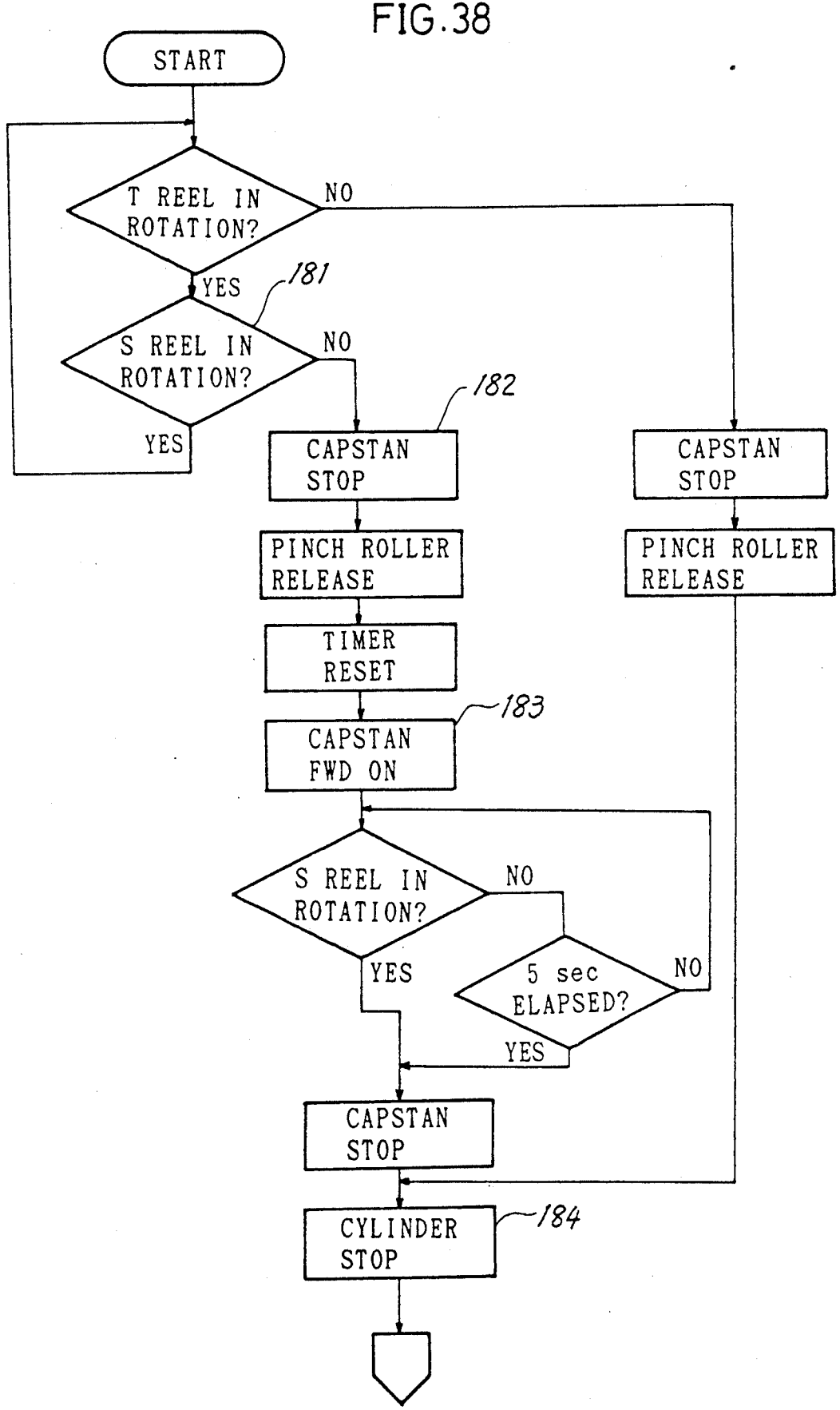
FIG. 38 is a flow chart showing a tape slack treating process.

The tape slack treating process will be descried with reference to FIG. 38.

If the tape slackens between the head cylinder 11 and the capstan while it is being rewound, the supply reel support 21 only stops rotating. This is detected by the supply reel rotation sensor 138 (FIG. 38, 181). In response to the resulting detection signal, the rotation of the capstan 12 is interrupted temporarily (FIG. 38, 182). Next, the loading motor 31 is brought into rotation in the unloading direction to release the pinch roller 81 from the capstan 12, and the capstan 12 is rotated at 7 times the usual speed for playback in FWD direction (direction in which the magnetic tape is forwarded toward the take-up reel, see FIG. 38, 183), whereby the take-up reel support 22 is rotated toward the tape winding direction. Subsequently, upon the start of rotation of the supply reel support 21 or 5 seconds thereafter, the capstan 12 and the head cylinder 11 are stopped (FIG. 38, 184).

Thus, the slack is removed by winding the tape on the take-up reel.

The control system thereafter accepts only an instruction for ejection or to turn off the power supply.

The above 5-second time interval is provided by a timer in order to protect the tape in the case where the supply reel support 21 fails to rotate for one cause or another.

(2) Tape Unloading Process

If there is some obstacle hampering the movement of the reel chassis 2 ahead of the chassis 2 or the cassette holder 20 during the unloading operation of the reel chassis 2, the torque produced by the loading motor 31 will act as a load on the mechanism from the motor 31 through the reel chassis 2, thus possibly causing damage to this mechanism.

With the present VTR, the voltage for driving the loading motor 31 for unloading the reel chassis 2 is set to a lower level than that for the loading operation to minimize the possible damage (FIG. 36, periods $T_2$, $T_3$, $T_4$).

The drive voltage for unloading can be made lower than for loading because the mechanism can be free of the load for withdrawing the tape during unloading and therefore requires a smaller drive force for unloading than for loading.

Figure 36A:
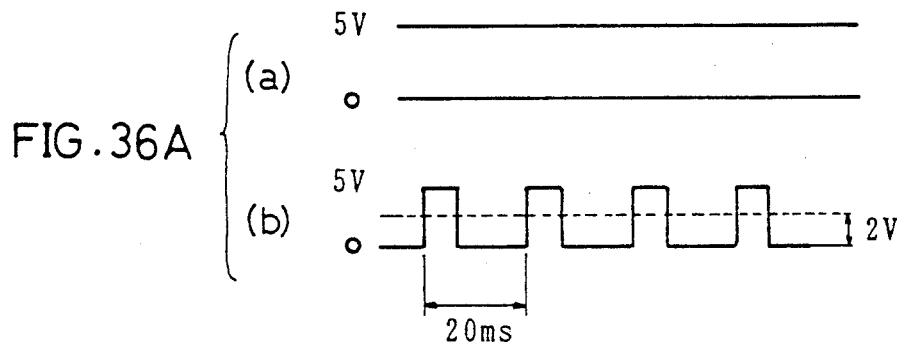
FIGS. 36A (a) and (b) are waveform diagrams of loading motor drive voltage.

FIGS. 36A (a) and (b) show the drive voltages to be applied to the loading motor 31 for loading and unloading, respectively.

For loading, a 5-volt d.c. voltage is applied to the loading motor 31, as shown in FIG. 36A (a), whereas for loading, pulse width modulated drive pulses, 20 msec in period and 40% in duty, are applied to the loading motor 31 so that the loading motor 31 is driven with a voltage levelled to about 2 V as shown in FIG. 36A (b).

(3) Tape Winding Process for Unloading

When the loading motor 31 is started toward the unloading direction in the ready mode of FIG. 21, the rotation of the worm 35 is transmitted to the rack 36 to start driving the reel chassis 2. However, the rotation of the first gear 71 of the gear mechanism 7 is not transmitted to the ring gears 6, 61 immediately owing to the intermittent rotation mechanism afforded by the circular-arc face 73a and the circular-arc face 75a, but is transmitted a predetermined period of time after the start of movement of the reel chassis 2. More specifically, the supply and take-up leaders 51, 54 start an unloading movement when the upper gear portion 73 of the first gear 71 comes into meshing with engagement with the lower gear portion 75 of the second gear 74.

Accordingly, during the process wherein the reel chassis 2 only moves along, the movement of the cassette on the chassis 2 withdraws the magnetic tape from the cassette, and the subsequent movement of the leaders 51, 54 in the unloading direction slackens the tape.

The slack in the tape is removed by the winding process as described below.

FIGS. 36 (a) to (e) show the timing of various control signals produced during unloading. FIG. 36 (a) shows LOAD END signal which changes to "H" upon opening of the first sensor switch 130. FIG. 36 (b) shows LOAD TOP signal which is changed to "H" by the opening of the second sensor switch 131 and to "L" by the closing of the third sensor switch 132. FIG. 36 (c) shows a cylinder ON signal for starting the head cylinder 11. FIG. 36 (d) shows a capstan ON signal for rotating the capstan 12 in FED direction. FIG. 36 (e) shows an unload ON signal for initiating the unloading motor 31 into rotation in the unloading direction.

Figure 39:
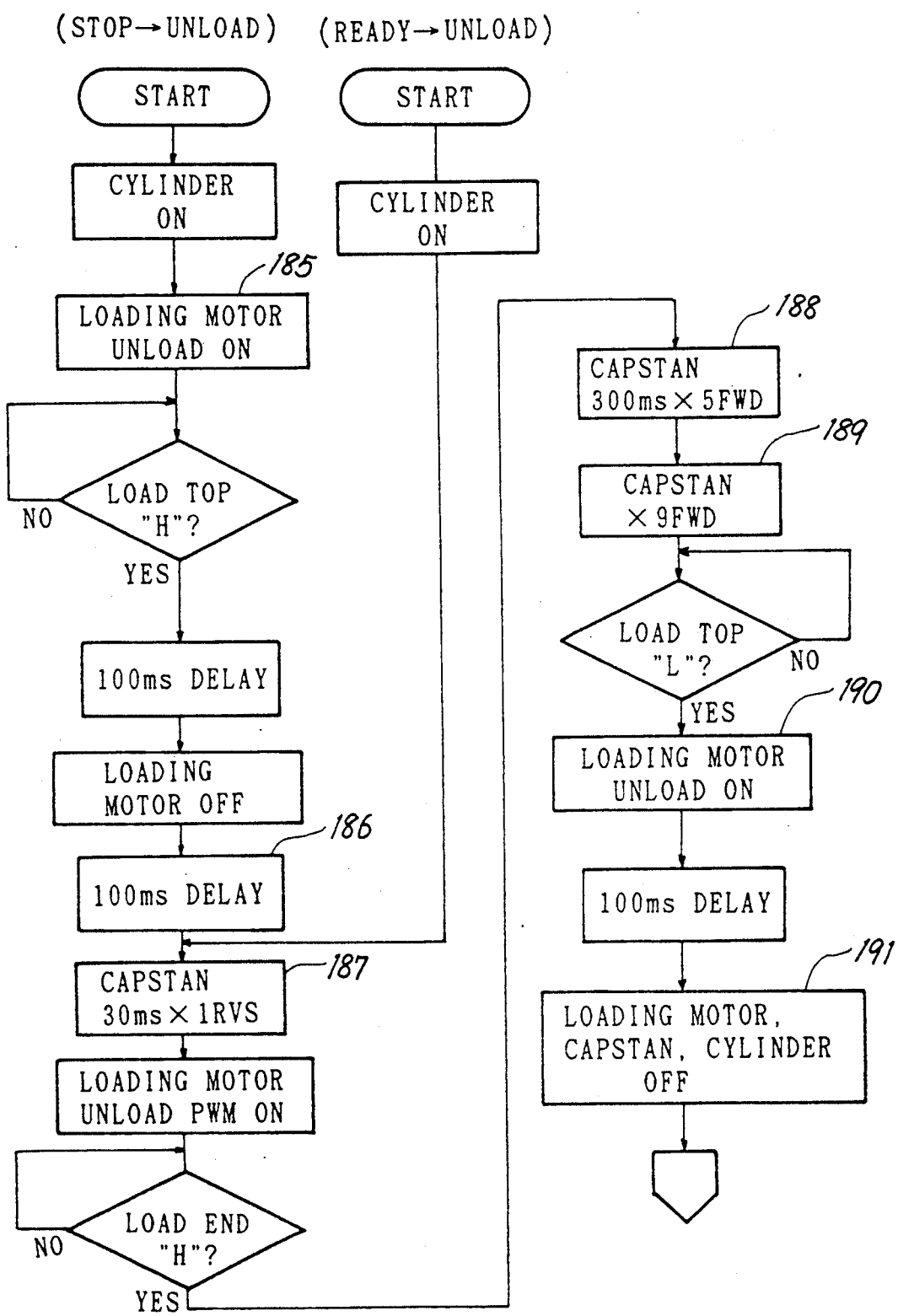
FIG. 39 is a flow chart illustrating a tape winding process for unloading.

FIG. 39 shows a program stored in the system controller.

The tape winding process for unloading will be described with reference to FIGS. 36 and 39.

When the reel chassis is to be unloaded in the stop mode, the head cylinder 11 is initiated into rotation first, and the pinch roller 81 is released from the capstan (FIG. 36, period $T_1$, FIG. 39, 185–186) for a change to the ready mode. Subsequently, upon lapse of 100 msec, as shown in FIG. 36 (d), the capstan 12 is rotated at $X_1$ (usual speed) for 30 msec in RVS direction (i.e., the direction in which the tape is rewound on the supply reel) (FIG. 39, 187), whereby the idler gear 112 is set in the neutral position as seen in FIG. 26. When the reel chassis is to be unloaded in the ready mode, the start of rotation of the head cylinder 11 is immediately followed by the rotation of the capstan 12 (FIG. 39, 187). The idler gear 112 is thus set in the neutral position to permit the tape to be paid off from the two reels when the reel chassis 2 moves with the leaders 51, 54 held at a stop, as described above.

Next, the loading motor 31 is started in the unloading direction to move the reel chassis 2 toward the standby-mode position. The LOAD END signal thereafter changes to "H" as shown in FIG. 36 (a), whereupon the capstan 12 is rotated in the FWD direction. In this way, the capstan 12 is held in the stop position while only the reel chassis 2 is moving (FIG. 36, period $T_2$) to prevent the tape from being displaced by being wound on the take-up reel.

For 30 msec (FIG. 36, period $T_3$) following the change of the LOAD END signal to "H", the capstan 12 is rotated at 5 times the usual speed (FIG. 39, 188). For the subsequent period until the eject mode is set up (FIG. 36, periods $T_4$ and $T_5$), the capstan 12 is driven at 9 times the usual speed (FIG. 39, 189) to wind up the tape paid off from the cassette on the take-up reel. In this way, the capstan 12 is rotated at a low speed during a short period of time following the start of movement of the supply and take-up leaders 51, 54 for the following two reasons. Owing to the engagement of the pressing face 73b of the first gear 71 with the second gear 74, the speed of the leaders immediately after the start of their movement is lower than when usual teeth of the two gears 71, 74 are in mesh (see, FIG. 24), so that the amount of slack of the tape due to the movement of the leaders is initially small and thereafter increases. Accordingly, the tape winding speed is made lower for a short period of time immediately after the start of the movement of the leaders to thereby prevent displacement of the tape due to unloading. Further the time when the LOAD END signal changes to "H", as shown in FIG. 36 (a), inevitably slightly differs from the time when the leaders actually start moving, so that the tape becomes displaced if wound up at a high speed from the beginning despite the delay of the start of the movement of the leaders.

When the reel chassis 2 has been completely unloaded upon the lapse of the period $T_4$ shown, as in FIG. 36, the LOAD TOP signal changes to "L", as seen in FIG. 36 (b).

After the LOAD TOP signal has changed to "L", the loading motor 31 is further rotated in the unloading direction with the usual drive voltage (5 V) only for 100 msec (FIG. 39, 190) to thereby unlock the cassette holder 20.

Finally, the loading motor 31, the capstan 12 and the head cylinder 11 are stopped (FIG. 39, 191) to complete the process.

Consequently, the tape can be withdrawn smoothly at the start of unloading, and the reel cassette can be unloaded without greatly displacing the tape and free of slackening.

(4) Tape Handling Process to be Practiced When Cylinder is to be Stopped

For the change to the stop mode, the capstan 12 and the head cylinder 11 are stopped without releasing the pinch roller 81 from the capstan 12 as already stated so as to effect a rapid change from the stop mode to the play mode.

However, to smoothly bring the head cylinder 11 into operation from the stop mode, there is a need to give some slack to the magnetic tape between the head cylinder 11 and the capstan 12.

For a change to the stop mode, therefore, the capstan is rotated in the RVS direction for a specified period of time to intentionally slacken the tape. Nevertheless, the capstan 12, if merely driven in the RVS direction, gives rise to the objection that the rotation of the idler gear 112 rotates the supply reel support 21 as shown in FIG. 21 to rewind the tape. This is avoided by the following procedure.

When the stop mode is to be set up, the capstan motor 13 is initiated into rotation in the RVS direction with the swing idler 110 coupled to the take-up reel support 22 as seen in FIG. 30, whereby the tape is paid off toward the head cylinder 11 by the capstan 12 and thereby slackened during the swing of the idler 110 toward the supply reel support 21.

More specifically, this process is executed in the following manner.

Figure 37:
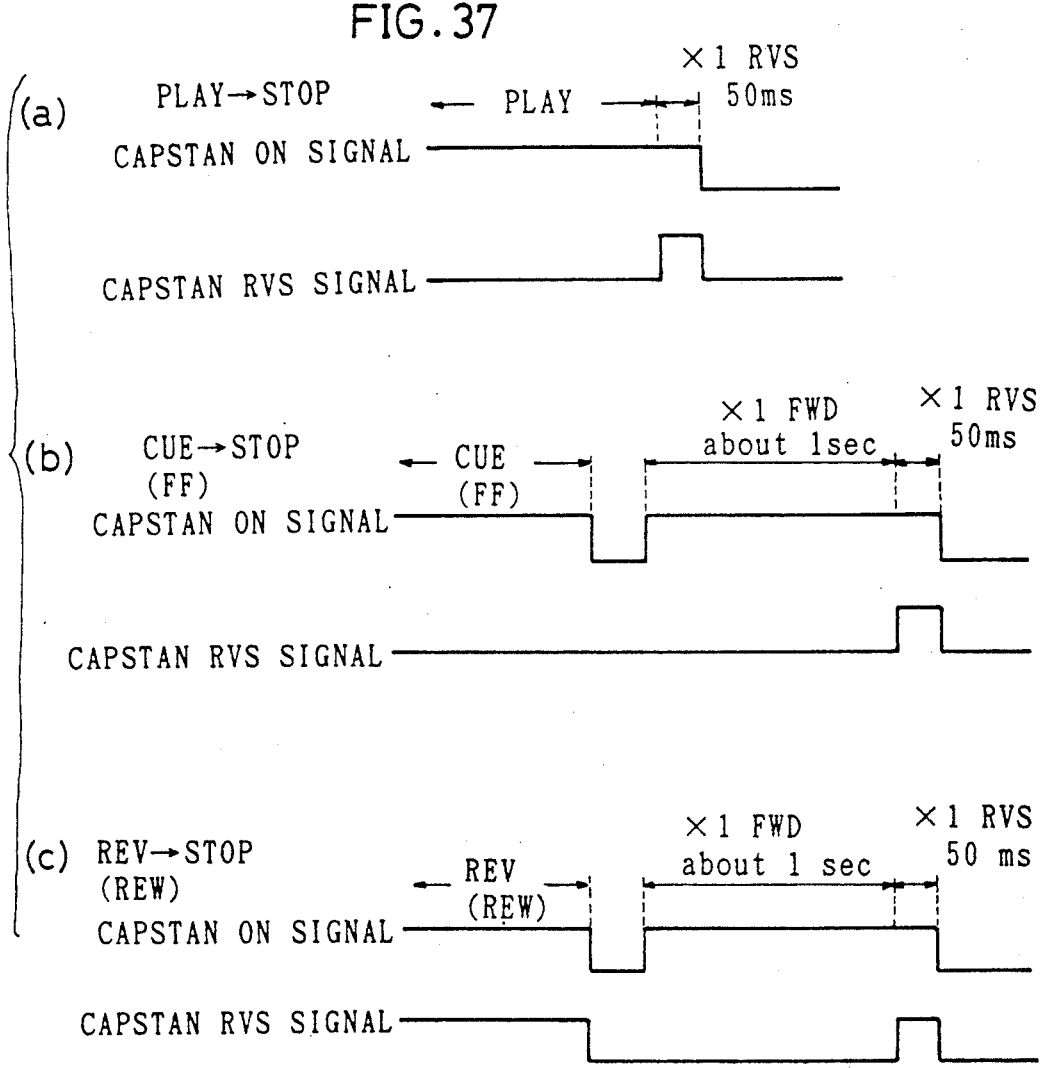
FIGS. 37 (a), (b) and (c) are timing charts for illustrating a tape handling process when the cylinder is to be stopped.

FIGS. 37 (a), (b) and (c) illustrate timing charts showing the capstan ON signal to be sent from the system controller 180 to the driver 13a for the capstan motor 13, and the capstan RVS signal for rotating the capstan motor in the RVS direction.

When the play mode is to be changed to the stop mode, the swing idler 110 is already coupled to the take-up reel support 22 in the play mode, so that the capstan is rotated at $X_1$, i.e. at the usual speed, in the RVS direction for 50 msec as seen in FIG. 37 (a) to slacken the tape.

When CUE (fast forward playback) mode or FF (fast forward) mode is to be changed to the stop mode, the capstan is temporarily stopped and then rotated at the usual speed in the FWD direction for about 1 sec as shown in FIG. 37 (b) to bring about the same state, as shown in FIG. 37 (a), followed by the same operation as in FIG. 37 (a) to give the tape the same amount of slack as for the change from the play mode to the stop mode.

Further when REV (reverse playback) mode or REW (tape rewinding) mode is to be changed to the stop mode, the swing idler is coupled to the supply reel support, so that the capstan is first stopped and then rotated at the usual speed in the FWD direction for about 1 second to couple the idler to the take-up reel support, followed by the same operation, as shown in FIG. 37 (a), to slacken the tape.

Consequently, the head cylinder can be smoothly initiated into rotation from the stop-mode state with the pinch roller held in pressing contact with the capstan.

(5) Tape End Handling Process

As already described, the tape to be loaded is paid off from both the supply reel, and the take-up reel and thereby protected to the greatest possible extent from the damage due to the friction between the head cylinder and the tape.

However, if the cassette in the holder is in the tape end state when the tape is to be loaded, the tape is paid off from the take-up reel only and is therefore likely to be damaged.

Accordingly, if the cassette is in the tape end state when the tape is to be unloaded, the tape is rewound by an amount corresponding to the amount of tape to be paid off from the supply reel for tape loading, and the tape is then unloaded. Consequently, when the cassette is removed from the VTR and thereafter loaded into the VTR again, the tape can be loaded by being paid off from both the reels.

Figure 40:
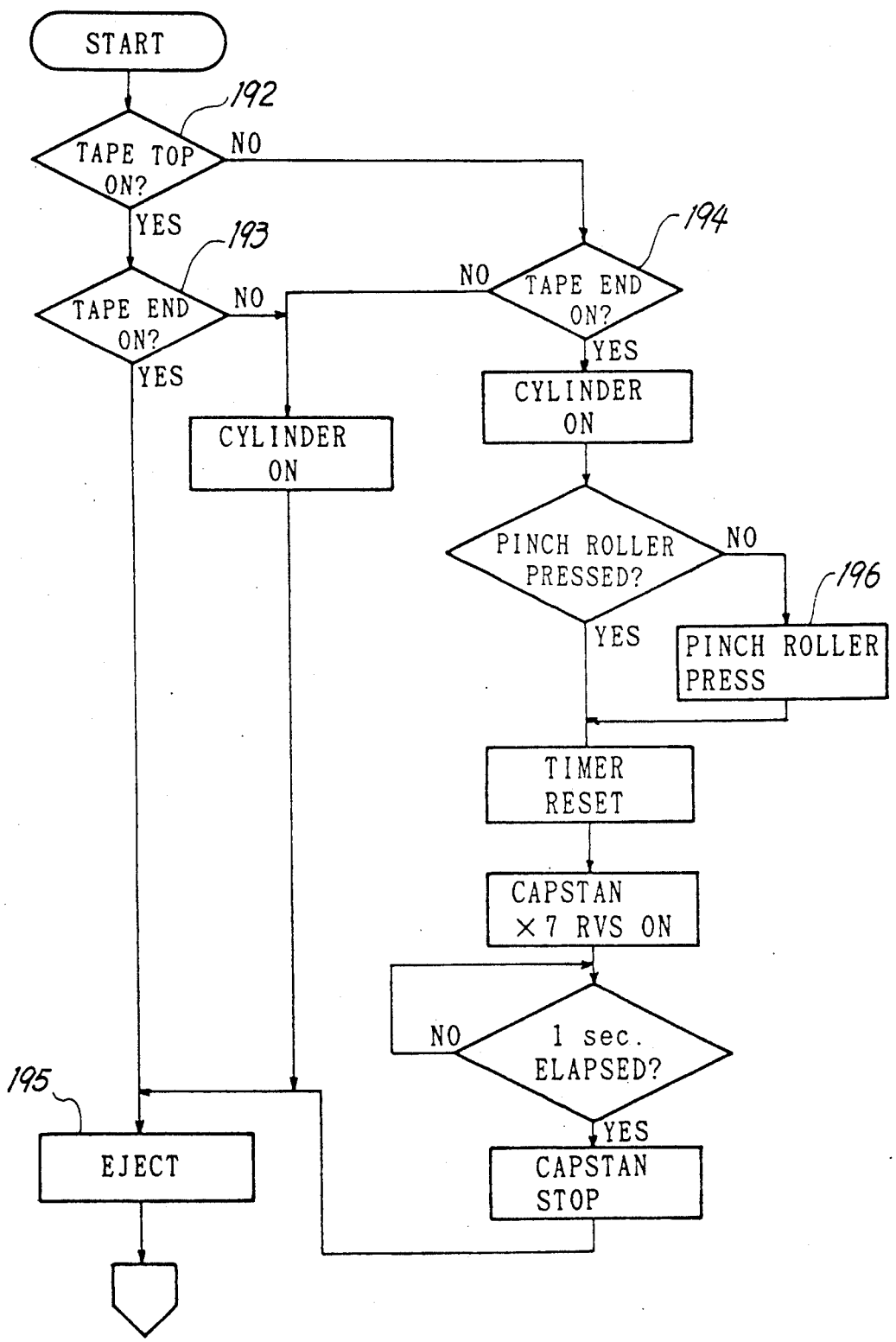
FIG. 40 is a flow chart illustrating tape end handling process.
Figure 41:
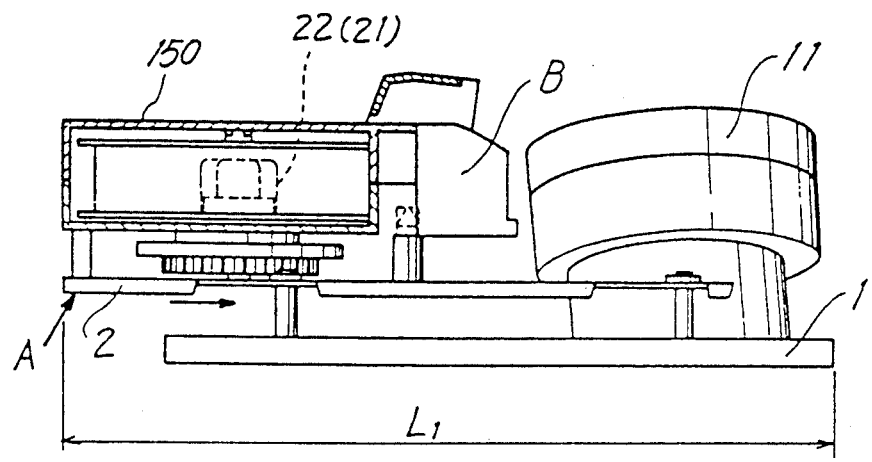
FIGS. 41 and 42 are side elevations illustrating the operation of a conventional system.
Figure 42:
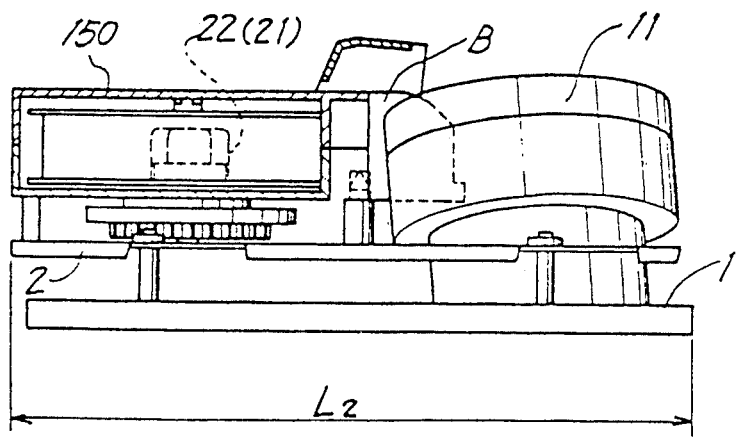

This process is executed according to the program as shown in FIG. 40.

When an eject command is given by the operation panel, the tape top sensor 137 and the tape end sensor 136 indicate whether the cassette is in the tape top state and whether it is in the tape end state (FIG. 40, 192, 193, 194).

If the tape top sensor is on and the tape end sensor is off, or if both the sensors are off, the head cylinder 11 is initiated into operation, and followed by an ejection, as indicated at 195.

If the tape sensor is off with the tape end sensor on, this indicates that the cassette is in the tape end state, so that the head cylinder 11 is started, and the pinch roller 81 is thereafter pressed against the capstan 12 (FIG. 40, 196).

The capstan 12 is then rotated at 7 times the usual speed in the RVS direction for 1 second to rewind the tape as already stated.

The capstan 12 is subsequently stopped, followed by the ejection (195).

Consequently, when the cassette in the tape end state after signal recording or reproduction is loaded into the VTR again, the tape can be loaded in place by being paid off from both the cassette reels, whereby the tape can be protected from damage.

The drawings and embodiment are given for the illustration of the present invention and are not to be interpreted as limiting or reducing the scope of the invention as defined in the appended claims.

The construction of the apparatus of the invention is not limited to the foregoing embodiment, but can be modified variously by one skilled in the art without departing from the spirit of the invention disclosed in the claims.

What is claimed is:

1. A recording-reproduction system, comprising:
   a head cylinder and a capstan rotatable by a capstan motor and disposed at a tape outlet side of the head cylinder, wherein a magnetic tape is transported from the head cylinder toward the capstan in a play mode with the tape held in pressing contact with the capstan by a pinch roller; and
   a stop mode setting apparatus which comprises a system controller means to be given a command for a change to a stop mode to stop the head cylinder and the capstan in the play mode, and a driver means for driving the capstan motor in response to a control signal from the system controller means, the system controller means having capstan control means for controlling the starting, stopping and rotational direction of the capstan motor, the system controller means being operable to produce the control signal outputted to the driver means for reversibly rotating the capstan motor only for a predetermined period of time when given the change command, wherein the capstan motor is coupled to a swing idler, and one of a pair of reel supports, the predetermined period of time being set to a length of time required for the swing idler to swingably move out of operative connection with one of the reel supports to a neutral position so as not to be in operative connection with either one of the reel supports.

2. The recording-reproduction system as defined in claim 1, wherein the system controller means, when given a command for a change from a fast forward playback mode or tape fast forwarding mode to the stop mode, produces the control signal for reversibly rotating the capstan motor only for the predetermined period of time after setting the capstan motor at the same rotation speed as a usual playback speed rotation.

3. The recording-reproduction system as defined in claim 1, wherein the system controller means, when given a command for a change from a reverse playback mode or tape rewinding mode to the stop mode, produces the control signal for reversibly rotating the capstan motor only for the predetermined period of time after setting the capstan motor in the same rotational direction as a usual playback rotational direction and at the same rotational speed as a rotational speed of the usual playback.

* * * * *